US005945652A

United States Patent [19]

Ohki et al.

[11] Patent Number: 5,945,652

[45] Date of Patent: Aug. 31, 1999

[54] ELECTRONIC WALLET AND METHOD FOR OPERATING THE SAME

[75] Inventors: Masayuki Ohki, Kodaira; Atsuhiko Urushihara; Koji Suso, both of Kokubunji; Masaki Takano, Musashino; Takeshi Hoshino, Kodaira; Yuhei Abe, Hitachinaka; Shigeyuki Itoh, Kawasaki, all of Japan

[73] Assignee: Hitachi, Ltd., Tokyo, Japan

[21] Appl. No.: 08/804,694

[22] Filed: Feb. 25, 1997

[30] Foreign Application Priority Data

Feb. 29, 1996 [JP] Japan .................................... 8-042786

[51] Int. Cl.[6] ...................................................... G06K 5/00

[52] U.S. Cl. ............................................................ 235/380

[58] Field of Search .................................... 235/380, 381, 235/383, 492, 472.01; 902/25, 26

[56] References Cited

U.S. PATENT DOCUMENTS

| | | | |
|---|---|---|---|
| 4,277,837 | 7/1981 | Stuckert | 235/379 |
| 4,454,414 | 6/1984 | Benton | 235/379 |
| 4,575,621 | 3/1986 | Dreifus | 235/492 |
| 4,575,622 | 3/1986 | Pellegrini | 235/382 |
| 4,634,845 | 1/1987 | Hale et al. | 235/379 |
| 4,764,666 | 8/1988 | Bergeron | 235/380 |
| 4,968,873 | 11/1990 | Dethloff et al. | 235/380 |
| 5,221,828 | 6/1993 | Gutman et al. | 235/379 |
| 5,352,875 | 10/1994 | Enomoto | 235/380 |
| 5,434,395 | 7/1995 | Storck et al. | 235/379 |
| 5,691,525 | 11/1997 | Aoki et al. | 235/380 |

FOREIGN PATENT DOCUMENTS

| | | |
|---|---|---|
| 61-75996 | 4/1986 | Japan . |
| 7-78281 | 3/1995 | Japan . |

OTHER PUBLICATIONS

Mondex Magazine, launch issue, "Facing The Future The Worldwide Drive Towards Electronic Cash" * Missing month & year.

*Primary Examiner*—Thien Minh Le
*Assistant Examiner*—Diane I. Lee
*Attorney, Agent, or Firm*—Fay, Sharpe, Beall, Fagan, Minnich & McKee

[57] ABSTRACT

An electronic wallet includes a plurality of operating keys at least having a plurality of numeric and calculation keys, a display part for displaying thereon electronic money information and IC card state information, at least one independent function switch in addition to a power switch, a plurality of control keys for operating the electronic money information stored in IC cards and the IC card state information, and a plurality of function keys having a plurality of function level layers having a plurality of tasks, for selecting the plurality of tasks having the respective function level layers. Thereby the electronic wallet can have many functions. Further, a modem unit, which is removably mounted to card slots of the electronic wallet, is provided with a through opening to communicate with the card slots and a modular jack to be connected to a communication line. Since a user can insert the IC card into the electronic wallet from the card slots with the modem unit already mounted to the card slots, handling of the electronic wallet is convenient upon transfer of the electronic money through the communication line. In addition, the user can insert the IC card into the electronic wallet which is still connected to the communication line.

29 Claims, 20 Drawing Sheets

ELECTRONIC WALLET AND METHOD FOR OPERATING THE SAME

CROSS-REFERENCES TO RELATED APPLICATIONS

This application relates to U.S. patent application Ser. No. 08/690,966 filed Aug. 1, 1996 entitled "Pocket-size Information Transfer Apparatus and IC Card Using the Same", by M. WAKABAYASHI et al.; U.S. patent application Ser. No. to be assigned filed Dec. 4, 1996 entitled "IC Card Reader/Writer and Method of Operation Thereof", by M. OHKI et al.; and U.S. patent application Ser. No. to be assigned field Dec. 3, 1996 entitled "Reader/Writer for Electronic Money Card for Use in Personal Computer Including The Same", by M. OHKI et al, the disclosure of which are incorporated herein by references.

BACKGROUND OF THE INVENTION

The present invention relates to electronic wallets in which an IC card for use in an electronic money system is incorporated and more particularly, to an electronic wallet which is suitably used for small payment of electronic money based on an IC card having electronic money recorded or stored therein.

In recent years, there has been suggested an electronic money system in which transaction of electronic money is carried out through mutual communication between IC cards having electronic money stored therein. The IC card used in the system comprises a microprocessor having a communication function therein and a memory such as an electrically erasable programmable read-only memory (EEPROM) for storing therein a procedure program and the current remainder or balance of the electronic money. In operation of the IC card, when a user of the card slots the card into one of terminals equipped in banks, shops, personal houses, etc. in the electronic money system, the user can deposit or spend the electronic money with respect to another IC card through a communication line. Or when the user slots the card into one of terminals dedicated to system, he can deposit or spend the electronic money with respect to another IC card.

SUMMARY OF THE INVENTION

It is therefore an object of the present invention to provide an electronic wallet which a user an carry with him and in which incorporated is an IC card having electronic money stored therein for use in an electronic money system. A related object of the present invention is to provide an electronic wallet which enables payment of electronic money between individuals, between individual and bank, and between individual and distribution industry retail store through signal transfer between IC cards or between IC cards through public telephone line or the like, and also to provide a method for operating the electronic wallet.

An another object of the present invention is to provide an electronic wallet which can require a less number of operating keys arranged on a keyboard for easy handling, can facilitate clear display, understanding, connection with a communication system, and can be made thin for easy portability, and also to provide a method for operating the electronic wallet.

In accordance with a first aspect of the present invention, the above objects can be attained by an electronic wallet which comprises a plurality of operating keys, a display part for displaying the electronic money information thereon, and at least one independent function switch in addition to a power switch, wherein the electronic money information stored in the IC cards are displayed on the display part while the independent function switch is operated. Thus, when the user releases his finger from the independent function switch, the switch is put in its OFF state so that the user can easily know the balance of the IC card without wasteful consumption of a battery.

In accordance with a second aspect of the present invention, there is provided an electronic wallet which comprises a plurality of operating keys, a display part for displaying the electronic money information thereon, and at least one independent function switch in addition to a power switch, wherein one of the IC cards is put in its lock state to inhibit data processing of one of the IC cards while the independent function switch is operated. Thus, when the user releases his finger from the independent function switch, the switch is put in its OFF state so that the electronic wallet is put in such a lock as easily put the IC card in the lock state.

In accordance with a third aspect of the present invention, there is provided an electronic wallet which comprises a plurality of operating keys, a display part for displaying the electronic money information thereon, and a controller having contacts for causing appearance of the electronic money information stored in the IC cards on the display part for a predetermined time during which contacts of the IC cards are put in their conductive state. Thus, the user can momentarily know the state of the IC card and can sequentially examine the states of the plurality of IC cards.

In accordance with a fourth aspect of the present invention, there is provided an electronic wallet which comprises a plurality of operating keys having a plurality of numeric keys and calculation keys, a display part for displaying the electronic money information and IC card state information thereon, at least one independent function switch in addition to a power switch, a plurality of control keys for operating the electronic money information stored in the IC cards and the IC card state information, and a function key having a plurality of function level layers having a plurality of tasks for selecting the plurality of tasks having the function level layers. Thus, the electronic wallet can have many functions.

Further, in the case where the aforementioned arrangement further includes up and down keys as the control keys; either one of the first and second IC cards is instructed by operation of any of the keys when the first subtask is instructed; the transfer direction of the electronic money information is instructed by operation of any of the keys when the third subtask is instructed; the latest transaction information of the IC card is searched from the beginning by operation of any of the keys when the fourth subtask is instructed, and, tasks of the second function level layer are selected by operation of any of the keys when the fifth subtask is instructed. Thus, the electronic wallet can have a further increased number of many functions.

Further, a modem unit, which is removably mounted to card slots of the electronic wallet, is provided with a through opening to communicate with the card slots and a modular jack to be connected to a communication line. Since a user can insert the IC card into the electronic wallet from the card slots with the modem unit already mounted to the card slots, handling of the electronic wallet is convenient upon transfer of the electronic money through the communication line. In addition, the user can insert the IC card into the electronic wallet which is still connected to the communication line.

A party to which the electronic money information is to be transferred from one of the IC cards is the other of the IC cards inserted into the other card slot, a terminal capable of transmitting or receiving electronic money to or from the IC card, or an IC card of another electronic wallet connected to the first-mentioned electronic wallet through the modem unit.

DESCRIPTION OF THE PREFERRED EMBODIMENTS

An embodiment of an electronic wallet usable in an electronic money system in accordance with the present invention will be detailed with reference to the attached drawings.

Figure 1:
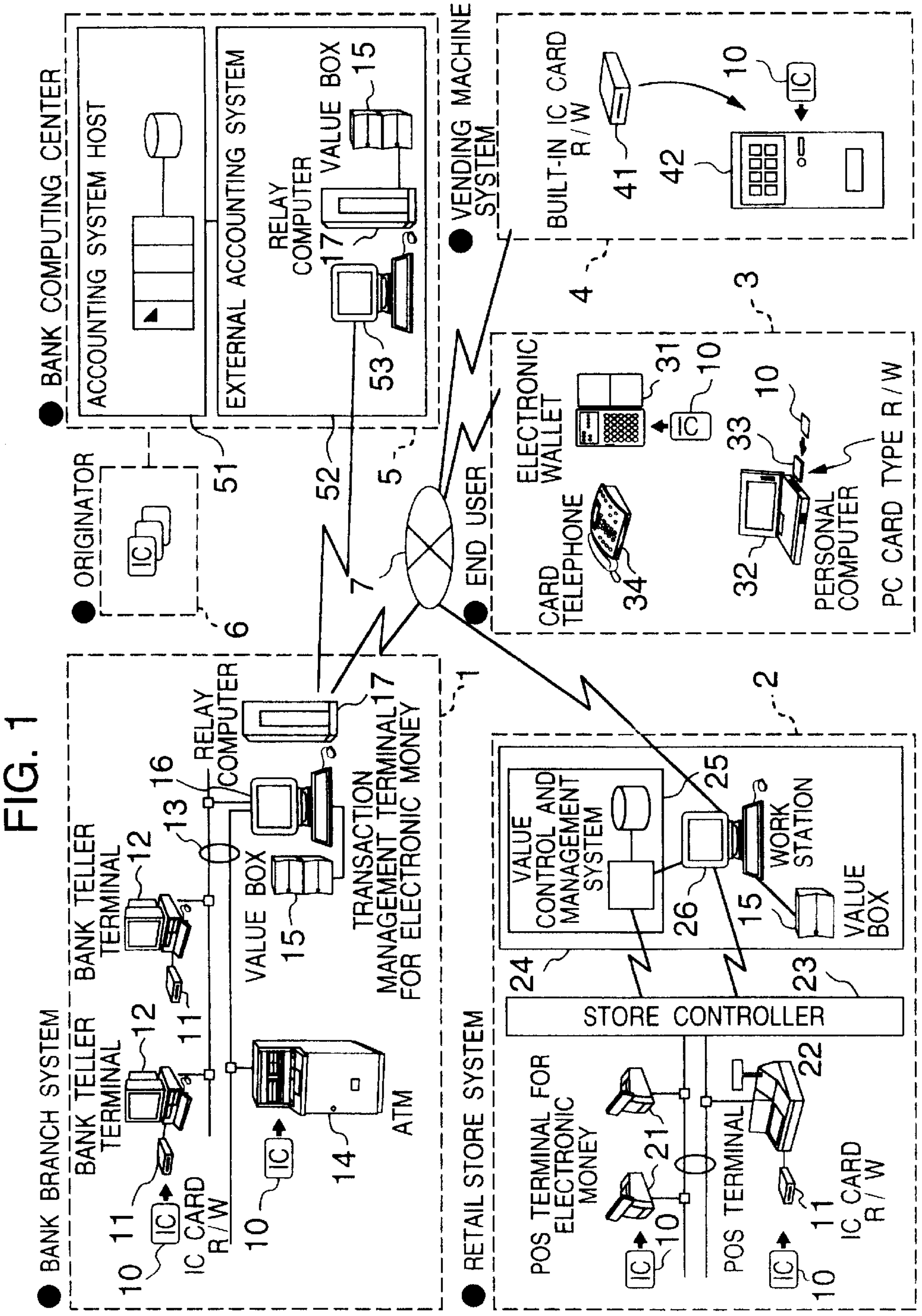
FIG. 1 is a block diagram of an electronic money system to which an electronic wallet in accordance with the present invention is applied.

FIG. 1 shows a block diagram of a configuration of an electronic money system to which an electronic wallet according to the present invention is applied. Explanation will first be made as to the configuration of the electronic money system. The system illustrated in FIG. 1 includes a bank branch system 1, a retail store system 2, an public user system 3, an vending machine system 4, a bank computing center 5, an originator 6, a public telephone line 7, IC cards 10, external IC card readers/writers 11, bank teller terminals 12, an internal communication line 13, an automatic teller machine (ATM) 14, value boxes 15, a transaction management terminal 16 for electronic money, relay computers 17, POS (point of sales system) terminals 21 for electronic money, a POS terminal 22, a store controller 23, a center device 24, a value control and management system 25, a workstation 26, an electronic wallet 31, a personal computer 32, a PC type card reader/writer 33, an IC card telephone set 34, a built-in IC card reader/writer 41, a vending machine 42, an accounting system host 51, an external accounting system 52, and an external management terminal 53.

In the electronic money system of FIG. 1, the bank branch system 1, the retail store system 2 provided such a large scale store as a supermarket, the personal computer 32 as the public user system 3, and the IC card telephone set 34 are connected to the public telephone line 7. Systems not connected to the public telephone line 7 may include, for example, the vending machine system 4. Although typical systems are provided respectively one in the illustrated example, each typical system may be provided by a plurality of numbers to be connected to the public telephone line 7. Further, the bank branch system is connected through a private line or the like to the bank computing center 5, which in turn is connected with the originator 6.

The IC card 10 is made up of a microprocessor having a communication function therein and a memory such as an EEPROM for storing therein a procedure program and the balance of its electronic money. The IC card is possessed by a person as an end user and is also issued from banks, stores, vending machines belonging to the electronic money system.

In the bank branch system 1, as well known, the bank teller terminals 12 and the automatic teller machine 14 are interconnected by means of the internal communication line 13, and are further connected through the relay computer 17 to the bank computing center. The bank teller terminal 12 is provided with the external IC card reader/writer 11 for electronic money payment. The automatic teller machine 14, which incorporates the IC card reader/writer, is also connected to the value box 15 via the transaction management terminal 16 for electronic money.

The bank computing center 5 comprises the accounting system host 51 and the external accounting system 52. The external accounting system 52 includes the external management terminal 53, the relay computer 17 and the value box 15.

In the retail store system 2, usually, the POS terminal is connected to the center device 24 through the internal communication line 13 and store controller 23. The usual POS terminal 22 is attached with the external IC card reader/writer 11 for electronic money payment. Also provided in the retail store system 2 is the POS terminal 21 for electronic money. The center device 24 has the value control and management system 25, the workstation 26 and the value box 15.

The public user system 3 is mainly a personal user system and, in its simplest form, the system 3 may have only the electronic wallet 31 which can display the balance of electronic money stored in the IC card. The electronic wallet 31 may be added with such a function as an electronic calculator if necessary. The personal computer 32 is provided with the PC type card reader/ writer 33 for payment use of electronic money of an IC card possessed by the private user to be connected to the public telephone line 7. Also usable is the IC card telephone set 34 which corresponds to a usual telephone set but having an additional function of processing the IC card 10 having electronic money stored therein.

In the aforementioned public user system 3, when the personal computer 32 or the IC card telephone set 34 is provided therein with a pair of card readers/writers which can receive two IC cards therein, transaction of electronic money between the 2 IC cards can be realized. For example, when it is desired to transfer the electronic money of husband's IC card to wife's one, this can be carried out in the same manner as in usual cash handling.

The vending machine system 4 includes at least one vending machine 42 provided therein with a built-in IC card reader/writer 41.

Explanation will then be made as to how to use the electronic money system to which the present invention is applied and which is arranged as mentioned above.

The originator 6 distributes the IC cards 10 to banks, stores, vending machines, private users, etc. belonging to the system. Bank usually accepts electronic money in exchange of cash being now circulating and stores the electronic money in the value box 15 provided in the external accounting system 52. The value box 15 stores therein a multiplicity of the IC cards 10 to which the electronic money accepted from the originator is distributed and in which the electronic money is stored as distributed. The electronic money stored in the IC cards stored in the value box 15 is distributed to the IC cards 10 of the value box 15 in the bank branch system 1 installed in each bank branch.

A private end user belonging to the electronic money system and possessing the distributed IC card 10, with use of the bank teller terminal 12 or automatic teller machine 14 in the bank branch system 1, exchanges deposit money at its own account of the bank for corresponding electronic money and transfers the electronic money to its own IC card 10. The user also can connect his own personal computer 32 having the PC type card reader/writer 33 or the IC card telephone set 34 to the bank branch system 1 through the public telephone line 7 to exchange the deposit money of its own account for corresponding electronic money and store it in his own IC card 10, as in the above case.

When the user wishes to use the above electronic money, his IC card is connected to the IC card of the value box 15 in the bank branch system 1 through the bank teller terminal 12, automatic teller machine 14, personal computer 32, or the reader/writer of the IC card telephone set 34. And under control of the transaction management terminal 16 for electronic money, the electronic money stored in the IC card 10 of the value box 15 in the bank branch system 1 is transferred to his carrying IC card 10. At this time, the balance of the electronic money stored in the IC card 10 of the value box 15 in the bank branch system 1 is reduced by an amount of the electronic money transferred to his carrying IC card 10. Withdrawing deposit money from his own account is carried out in the same manner as the conventional one.

Although explanation has been made in connection with the case where the deposit money of the user's bank account is transferred from the IC card of the value box 15 of the bank branch system 1 and then stored in his carrying IC card in the foregoing case, he may carry cash to a teller of the bank or to a teller of the originator to store the corresponding electronic money into his carrying IC card.

Alternately, the electronic money of his carrying IC card, in the reverse manner as the above, may be returned to the IC card of the value box 15 of the bank branch system 1 through the bank teller terminal 12, automatic teller machine 14 or personal computer 32 to deposit it at its own account.

In this way, the user of his carrying IC card 10 stored the electronic money therein can go shopping at various stores or the like and accept various sorts of services in the same manner as in using cash.

Assume now that the user carrying the IC card 10 having the electronic money stored therein goes for shopping and buys and brings his desired products to the counter of the store having a POS terminal. The store clerk at the counter, in the same manner as usual cash, enters the bar codes of the products with use of a bar code reader to input the sale prices of the products to the POS terminal 21 or 22 and to calculate a total of the sale prices, and then asks the customer the total charge.

When the customer wishes, in place of cash, to pay it with his carrying IC card having the electronic money stored therein, the customer puts the IC card into an insertion slot provided in the POS terminal 21 for electronic money or into the external IC card reader/writer 11 connected to the usual POS terminal 22. This causes customer's IC card to be connected to one of IC cards of the value box 15 installed in the center device 24 of the store through the internal communication line 13 and workstation 26, so that the corresponding electronic money of customer's IC card is transferred to the associated IC card of the value box 15 of the center device 24. Then the POS terminal issues a receipt, terminating the paying operation of the purchase. In this case, the electronic money of customer's IC card is subtracted by an amount of the purchased money and instead the electronic money of the associated IC card of the store is correspondingly added.

In the above case, explanation has been made in the connection with the case where the transaction money of products is paid in the retail store system including a multiplicity of POS terminals and the value box installed in the center device 24 to store a multiplicity of IC cards therein. However, in such a system that a single deposit terminal is installed at a private shop or the like, when an IC card reader/writer is provided to the deposit terminal and an IC card possessed by the shop is incorporated in the deposit terminal, customer's payment based on electronic money can be carried out between shop's IC card and customer's IC card connected thereto via the IC card reader/writer. And the electronic money of the IC card possessed by the shop, as mentioned above, may be deposited in shop's bank account or may be changed to cash at a bank teller.

In the retail store system having the aforementioned POS terminal, the system may be formed so that each of the POS terminals is provided with an IC card, money transfer with customer's IC card is once carried out between the IC card of the POS terminal and customer's IC card, and as necessary, the electronic money of the IC card of the POS terminal is transferred to the IC card of the value box 15 in the center device 24.

When it is desired the vending machine 42 to participate in the electronic money system, the built-in IC card reader/writer 41 and an IC card may be incorporated in the vending machine 42, so that a customer can insert his IC card into the built-in IC card reader/writer 41 to transfer the purchased money amount to the machine IC card from customer's IC card.

Explanation will next be made as to an embodiment of the electronic wallet of the present invention used in the aforementioned electronic money system, by referring to the drawings.

Figure 2:
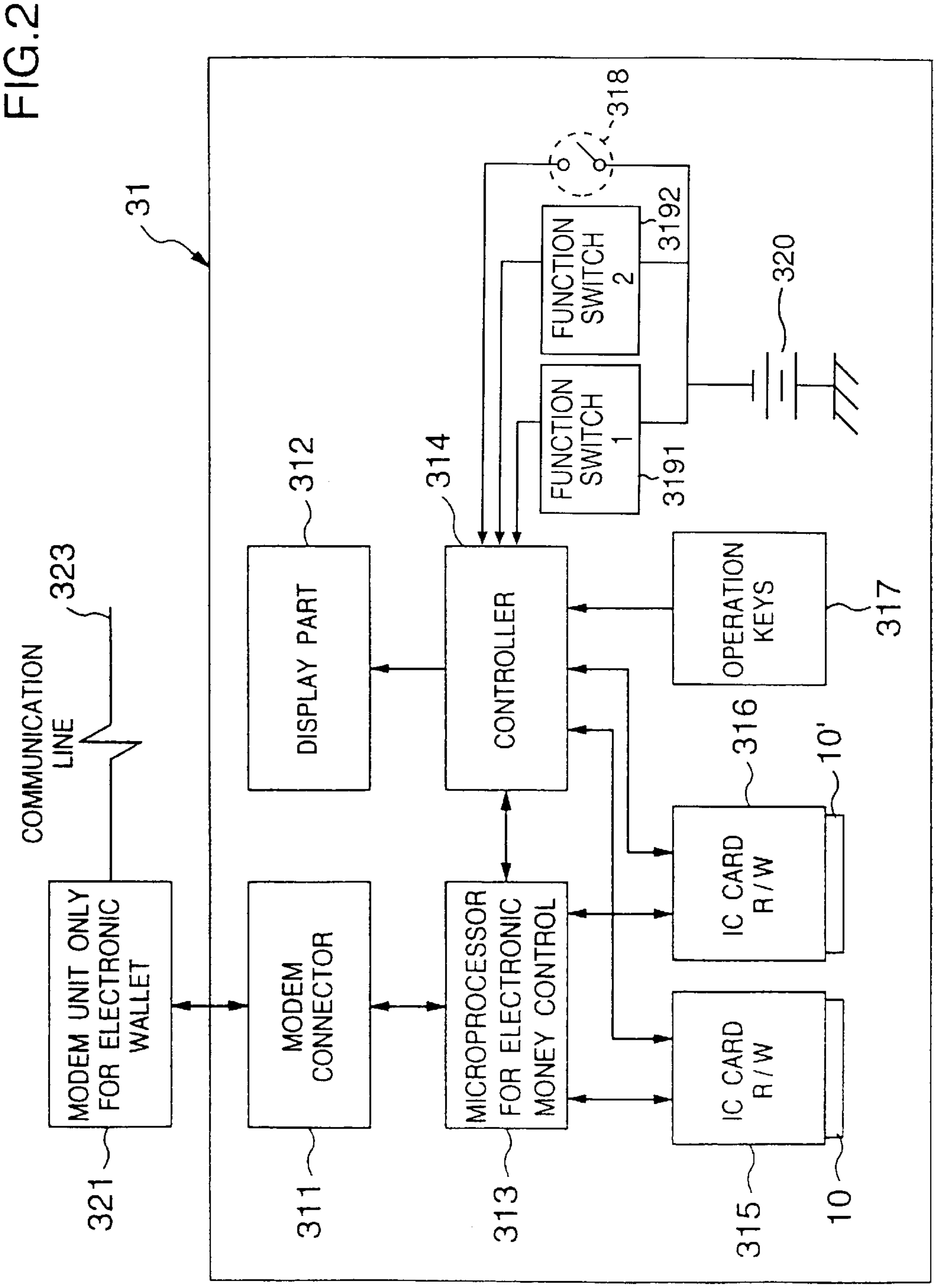
FIG. 2 is a block diagram of a circuit configuration of the electronic wallet.
Figure 3B:
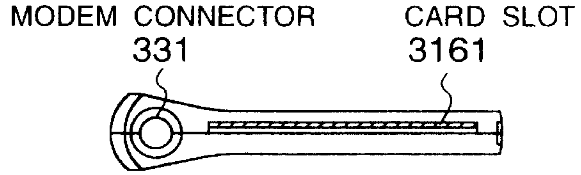
FIG. 3B is a top view of the electronic wallet.
Figure 3D:
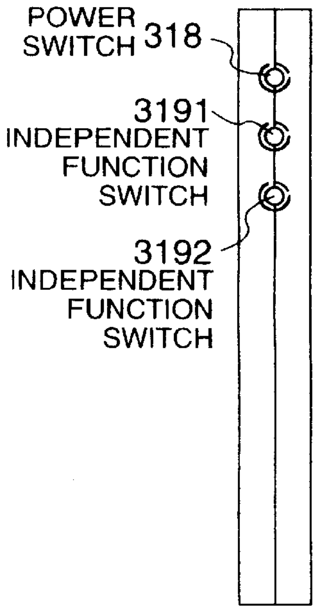
FIG. 3D is a side view of the electronic wallet.
Figure 3A:
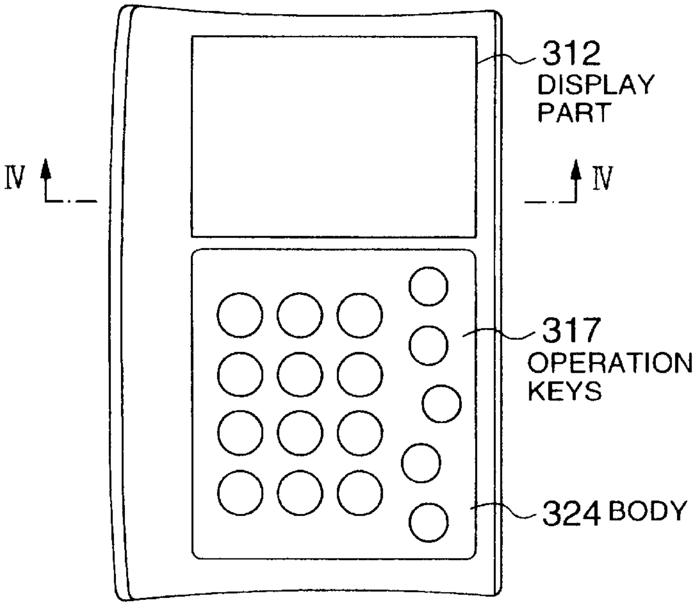
FIG. 3A is a plan view of an appearance of the electronic wallet.
Figure 3C:
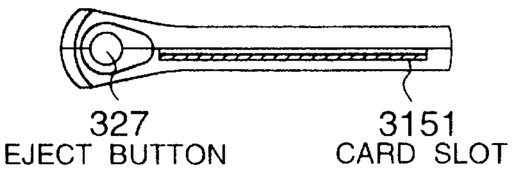
FIG. 3C is a bottom view of the electronic wallet.

Shown in FIG. 2 is a block diagram of a functional arrangement of the electronic wallet of the embodiment of the present invention. The electronic wallet illustrated in FIG. 2 includes a modem connector 311, a liquid crystal display part 312, a microprocessor 313 for control of electronic money, a controller 314, IC card readers/writers 315 and 316, an operating key part 317, a power switch 318, first and second independent function switches 3191 and 3192, a battery 320, a modem unit 321 for electronic wallet, and a communication line 323. The other reference numerals are the same as in those in FIG. 1. The first and second independent function switches 3191 and 3192 are put in their ON state while the operator depress the switches and in their OFF state when the operator releases therefrom.

The electronic wallet of the embodiment of the present invention, as shown in FIGS. 2 and 3, includes the IC card reader/writer 315 for the carrying or portable IC card 10 having electronic money stored therein, the IC card reader/writer 316 for an IC card 10' for mutual transfer of electronic money with the portable IC card 10, the operating key part 317, the liquid crystal display part 312 for displaying various sorts of information thereon, the power switch 318, the first and second independent function switches 3191 and 3192, the microprocessor 313 for control of electronic money for performing control over the electronic money within the IC cards 10 and 10', and the controller 314 for performing control over the entire electronic wallet 31 of the embodiment of the invention. The illustrated electronic wallet further includes the modem connector 311 for connecting the modem unit 321 only for electronic wallet to the internal communication line 13 for control of electronic money to realize transaction or transfer of electronic money with the IC card of another private user, bank or retail store connected thereto via the communication line 323.

Explanation will then be briefly made as to the functional operation of the electronic wallet of the embodiment of the present invention arranged as mentioned above, though the detail explanation of the functional operation will be made later.

When the user carries the illustrated electronic wallet 31, the electronic wallet is put in such a state that the power switch 318 is turned OFF and the IC card 10 having electronic money stored therein is set in the IC card reader/writer 315. When the user wishes to pay money for his purchase or the like with use of the IC card 10; the user takes out the electronic wallet 31 from his pocket or the like, pushes the first independent function switch 3191 to confirm the balance amount of the electronic money of the IC card 10 on the liquid crystal display part 312, pushes the second independent function switch 3192 to allow handling of the electronic money of the IC card 10, and then enters his own password for unlocking it. Thereafter, the user inserts his own IC card 10 into the terminal for IC card transaction installed at a store or the like to pay his purchased money on an electronic money basis in such a manner as already explained in connection with FIG. 1.

In the foregoing explanation, the first and second independent function switches 3191 and 3192 are put in their ON state only during user's depression thereof to supply power from the battery 320 to the electronic wallet 31 and to execute previously-assigned operations of the first and second independent function switches 3191 and 3192. In the above example, when the first independent function switch 3191 is depressed, this is detected by the controller 314 so that the balance of the electronic money of the IC card 10 is displayed on the liquid crystal display part 312. When the second independent function switch 3192 is depressed, on the other hand, the electronic money is put in such a mode as to enter its own password for unlocking the IC card 10 or in such a mode as to lock the IC card 10. In this connection, such an arrangement may be possible that, when the IC card 10 is inserted into the electronic wallet 31, the contacts of the IC card 10 are brought into contact with the associated contacts of the controller 314, so that the power of the IC card 10 is turned ON for a predetermined time, enabling indication of the balance of the electronic money on the liquid crystal display part 312. Further, the password may be replaced by secret character information.

Next, explanation will be briefly made in connection with a case where the IC card 10' possessed by, e.g., a child is inserted into the electronic wallet 31 to transfer electronic money to or from the IC card 10.

In this case, the user sets the IC card 10' in one of the two IC card readers/writers 316, turns ON the power switch 318, and then operates or pushes necessary keys on the operating key part 317 according to operational instructions displayed on the liquid crystal display part 312, whereby transfer of electronic money between the IC cards 10 and 10' can be realized. In this conjunction, the operating key part 317 has numeric and instruction keys.

When it is desired for the user to perform transaction of electronic money between another IC card and his own IC card 10, the user connects the modem unit 321 only for electronic wallet to the electronic wallet 31 to connect with the party device, and then pushes necessary keys on the operating key part 317 according to operational instructions displayed on the liquid crystal display part 312 in the same manner as the above, whereby the electronic money transfer can be realized between the his own IC card 10 and the remote IC card of another private user, bank, or the like.

Figure 4:
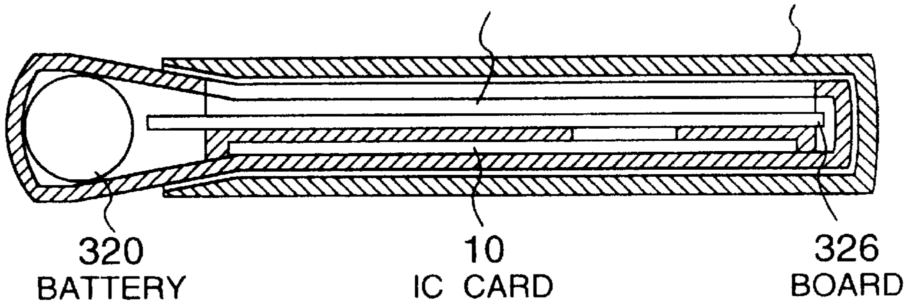
FIG. 4 is a cross-sectional view taken along line IV—IV in FIG. 3A.
Figure 5B:
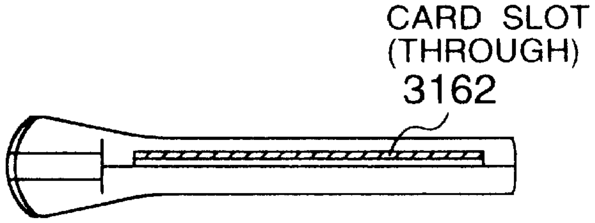
FIG. 5B is a top view of the modem unit.
Figure 5D:
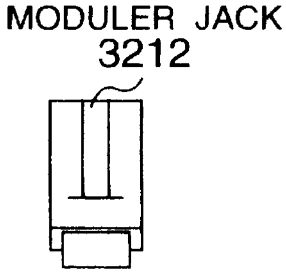
FIG. 5D is a side view of the modem unit.
Figure 5A:
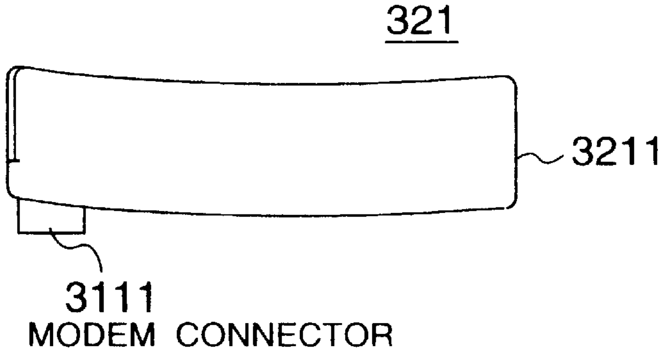
FIG. 5A is a plan view of an appearance of a modem unit.
Figure 5C:
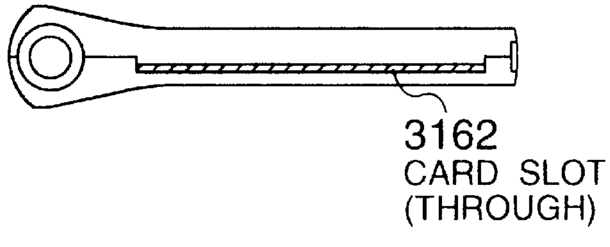
FIG. 5C is a bottom view of the modem unit.

FIGS. 3A to 3D show an appearance of the electronic wallet 31 in accordance with the embodiment of the present invention, FIG. 4 is a cross-sectional view of the electronic wallet of FIGS. 3A to 3D, and FIGS. 5A to 5D show an appearance of the modem unit 321 only for electronic wallet to be mounted to the electronic wallet 31 of FIGS. 3A to 3D. The structure of the electronic wallet 31 in the embodiment of the present invention will be explained by referring to these drawings. In FIGS. 3A–3D, 4 and 5A–5D, reference numeral 324 denotes a main body, numeral 325 denotes a protection cover, 326 a board, 327 an eject button, 3111 a modem connector, 3151, 3161, 3162 card slots, 3191 and 3192 first and second independent function switches, 3211 a modem unit main body, 3212 a modular jack. The other reference numerals are the same as those in FIG. 2.

In the electronic wallet 31 in accordance with the embodiment of the present invention, as shown in FIGS. 3A to 3D, and 4, the liquid crystal display part 312 and the operating key part 317 are provided on the front side of the main body 324; the modem connector 311 for connection with the modem unit 321 only for electronic wallet and the card slot 3161 for insertion of the IC card 10' therein are provided on the top side of the main body 324; the card slot 3151 for insertion of the IC card 10 therein and the eject button 327 for the card are provided on the bottom side of the main body 324; and the power switch 318 and the first and second independent function switches 3191 and 3192 are provided on the left side of the main body 324.

The electronic wallet 31 is arranged so that the user inserts its own IC card 10 into the card slot 3151 from the bottom side of the main body 324. In this case, the entire IC card 10 can be fully inserted into the interior of the main body 324. When the entire IC card 10 is fully inserted into the interior of the main body 324, the IC card 10 is put in such a state that the IC card 10 is set in the IC card reader/writer 315 (not shown). Removal of the IC card 10 from the IC card reader/writer 315 is effected by pushing the eject button 327.

Also provided on the top side of the illustrated electronic wallet 31 are the modem connector 311 for connection with the modem unit 321 only for electronic wallet to be explained later as well as the card slot 3161 for insertion of the other IC card 10' therein. Provided around the interior of the card slot 3161 is the IC card reader/writer 316 (not shown) for the IC card 10', so that, when the IC card 10' is inserted into the card slot 3161, the IC card 10' is set in the IC card reader/writer 316. In this case, when the IC card 10' is inserted into the IC card reader/writer 316 not by its full insertion distance but only by about half thereof, the IC card 10' is already set in the IC card reader/writer 316.

Further provided on the left side of the electronic wallet 31 are the power switch 318, the first independent function switch 3191 for confirmation of the electronic money balance, and the second independent function switch 3192 for locking or unlocking the IC card 10.

When the illustrated electronic wallet 31 is carried with its user, his portable IC card 10 is set in the card slot 3151, on which the protection cover 325 is mounted, as shown in FIG. 4. As also seen from FIG. 4, the board 326 forming such various function parts as mentioned in connection with FIG. 2 as well as the battery 320 such as a dry cell are housed in the interior of the electronic wallet 31.

With the modem unit 321 only for electronic wallet, as shown in FIGS. 5A to 5D, the modem unit main body 3211 is provided on its bottom side with the modem connector 3111 for connection with the modem connector 311 provided on the main body 324 (see FIG. 3A) of the electronic wallet 31, and the modem unit main body 3211 is provided therein with a modem for interface with the communication line. By coupling the modem connector 3111 to the modem connector 311 of the electronic wallet 31, the modem unit 321 is electrically and mechanically connected to the electronic wallet 31. The modem unit 321 is provided therein with the through card slot 3162 which can receive the other IC card 10' therein even when the modem unit 321 is already coupled to the electronic wallet 31.

The electronic wallet 31 in accordance with the embodiment of the present invention having such an external configuration as mentioned above can be made thin, when the function devices to be mounted in the interior of the electronic wallet are made, e.g., in the form of a sheet. For example, when the part of the electronic wallet other than the part for accommodation of the dry cell as its power source was made to have a thickness of about 8 mm and when the dry cell is of an AAA type, the left side part of the electronic wallet for accommodating the dry cell was able to be as thin as about 14 mm. Even when the protection cover 325 was mounted to the electronic wallet, the thickness of the main body 324 was able to be limited to about 14 mm, thus providing a highly convenient portability.

Figure 6:
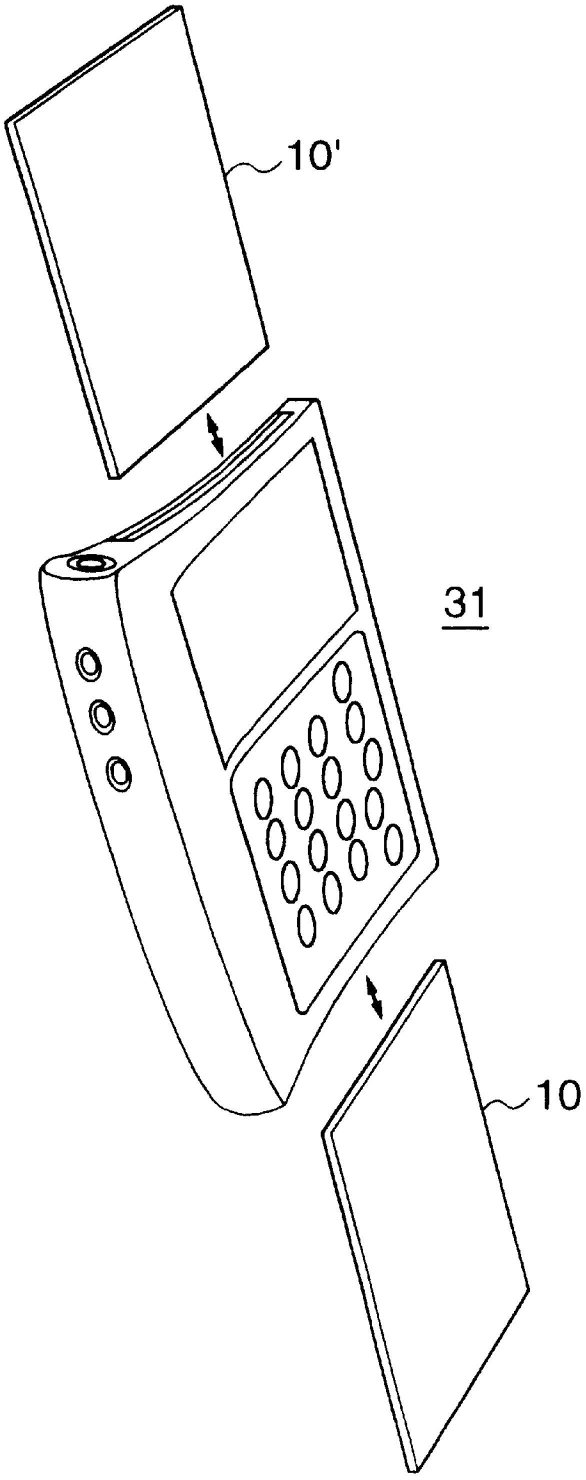
FIG. 6 is a perspective view of the electronic wallet and IC cards.
Figure 7:
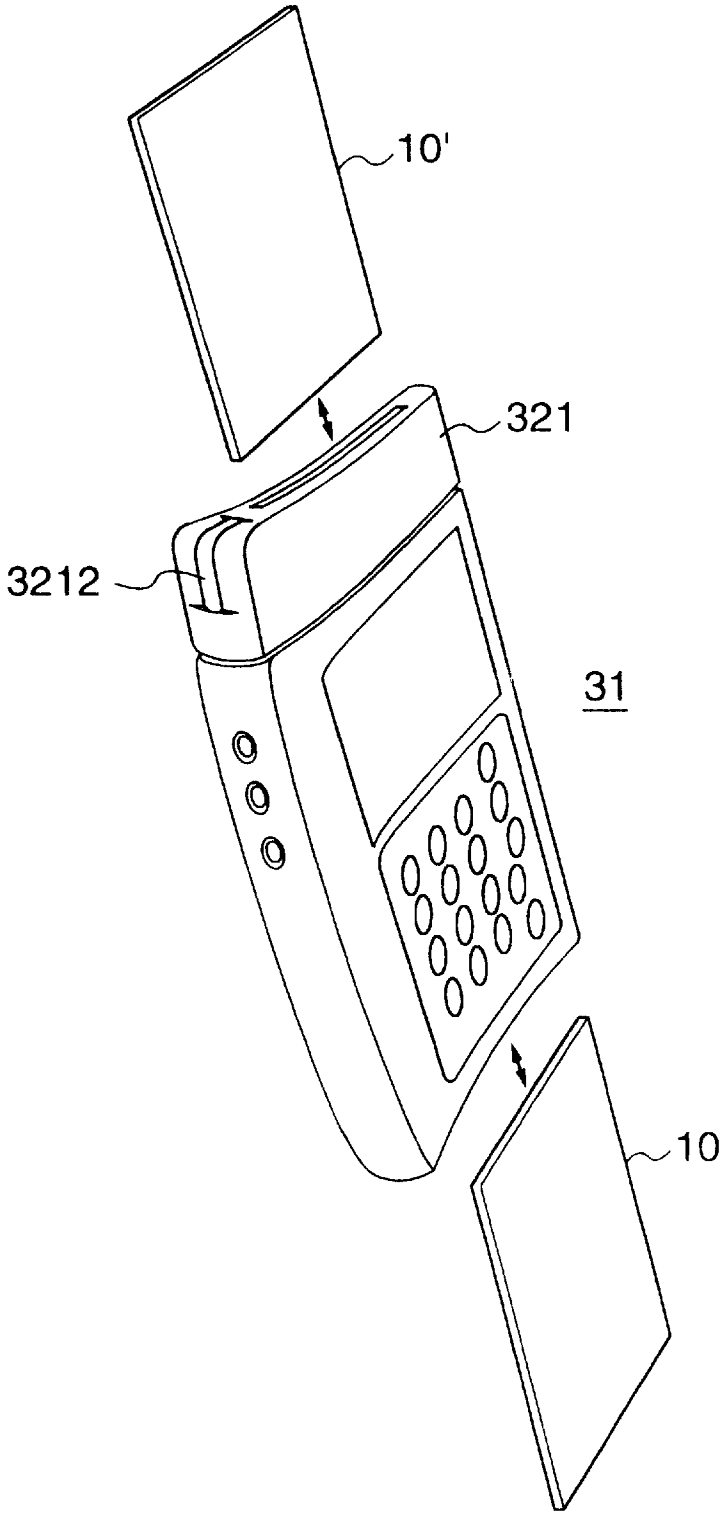
FIG. 7 is a perspective view of the electronic wallet having the modem unit mounted thereto and the IC cards.

FIG. 6 is a perspective view of the electronic wallet 31 and the 2 IC cards 10 and 10' in the embodiment of the present invention, and FIG. 7 is a perspective view of the electronic wallet 31 mounted with the modem unit 321 as well as the 2 IC cards 10 and 10' in the embodiment of the present invention.

As shown in FIGS. 6 and 7, the electronic wallet 31 according to the embodiment of the invention can receive the 2 IC cards 10 and 10' from the top and bottom sides, regardless of the fact that the modem unit 321 is already mounted to the electronic wallet 31. Further, the IC card 10 inserted from the bottom side of the electronic wallet can be fully inserted into the main body as already explained above. And even when the electronic wallet alone or the electronic wallet having the modem unit 321 mounted thereto can be carried with the user, in such a condition that the IC card 10 is housed in the main body.

Figure 8:
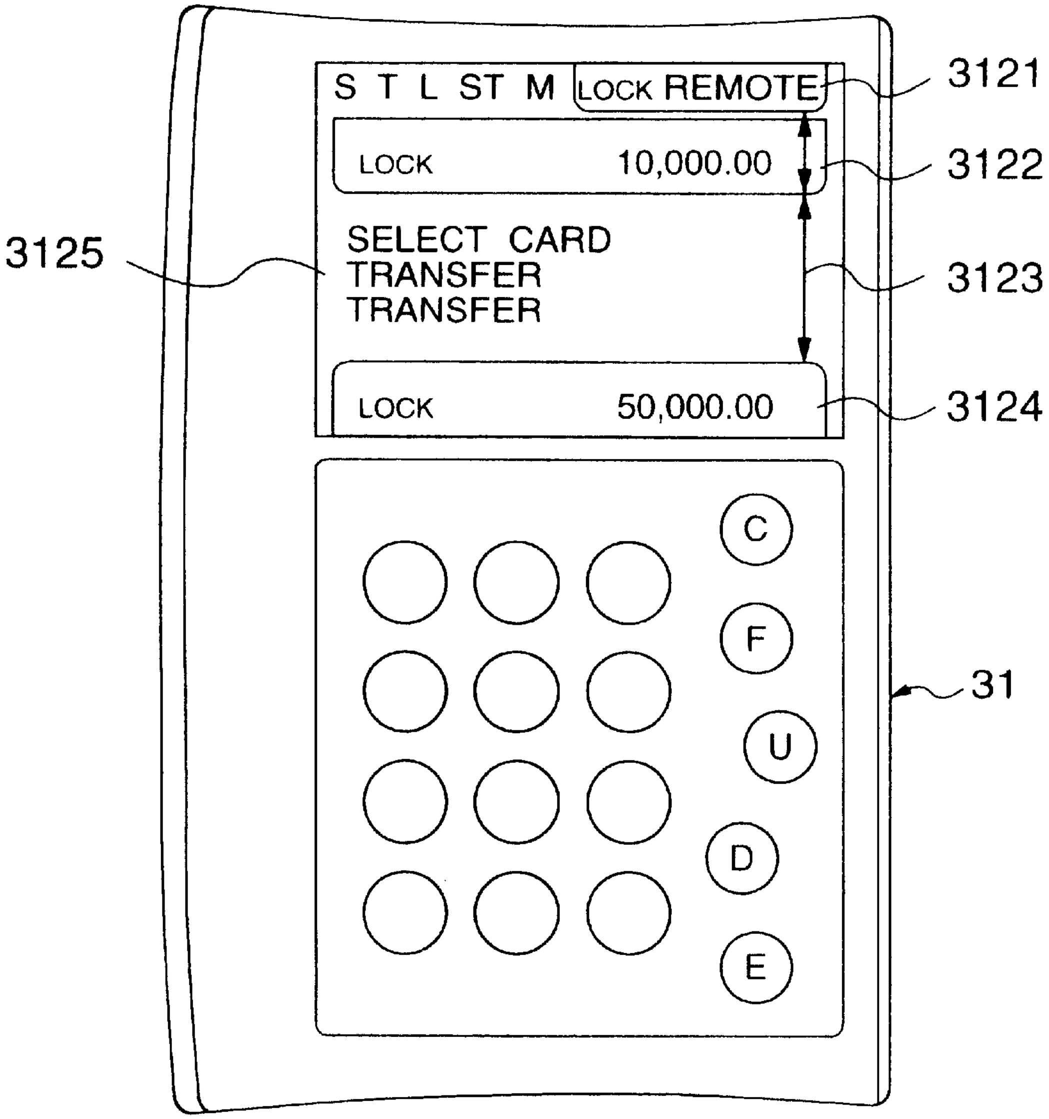
FIG. 8 is a plan view of operating, control and function keys of the electronic wallet as well as an example of display screen on a display unit of the electronic wallet.

Shown in FIG. 8 is a diagram for explaining an key array of the operating key part 317 of the electronic wallet 31 as well as a display state of the liquid crystal display part 312 in accordance with the embodiment of the present invention. The key array of the operating key part 317 of the electronic wallet 31 arranged as mentioned above and the display state of the liquid crystal display part 312 will be explained below with reference to the drawing.

As shown in FIG. 8, the operating key part 317 has thereon numeric keys for number input without no symbol thereon and instruction keys. Control keys 3500 include a clear/cancel key C, up and down keys U and D for instruction of transfer directions of electronic money, a function key F for selectively displaying various functions, and an enter key E as a run or execute key. These control keys 3500 are operated as associated with various sorts of information displayed on the liquid crystal display part 312 to thereby perform various types of operations which the user wants.

The information displayed on the liquid crystal display part 312 is as shown in FIG. 8, which will be explained below.

Tasks S, T, L, ST and M are cyclically displayed one after another by the function key F. The tasks S, T, L, ST and M perform respective functions of card selection, transfer, lock, store and menu.

Remote state information 3121 indicates when the other IC card (corresponding to the IC card 10 in FIG. 1) is connected via the communication line 323 and also indicate whether or not the card connected thereto is in its LOCK state.

Upper IC card information 3122 indicates the state of the other IC card inserted into the electronic wallet 31 from its top side. Located at the upper side of the liquid crystal display part 312, the upper IC card information 3122 indicates the balance of the electronic money of the card as well as the lock or unlock state of the card.

Lower IC card information 3124 indicates the state of user's IC card inserted into the electronic wallet from its bottom side. Located at the lower side of the liquid crystal display part 312, the lower IC card information 3124 indicates the balance of the electronic money of his card as well as the lock or unlock state of the card.

Transfer direction information 3123 indicates the transfer direction of the electronic money, that is, the transfer direction from the upper side IC card 10 to the lower side IC card 10' or vice versa. The transfer direction is indicated by an arrow.

Function information 3125 indicates the contents of the task.

Figure 9A:
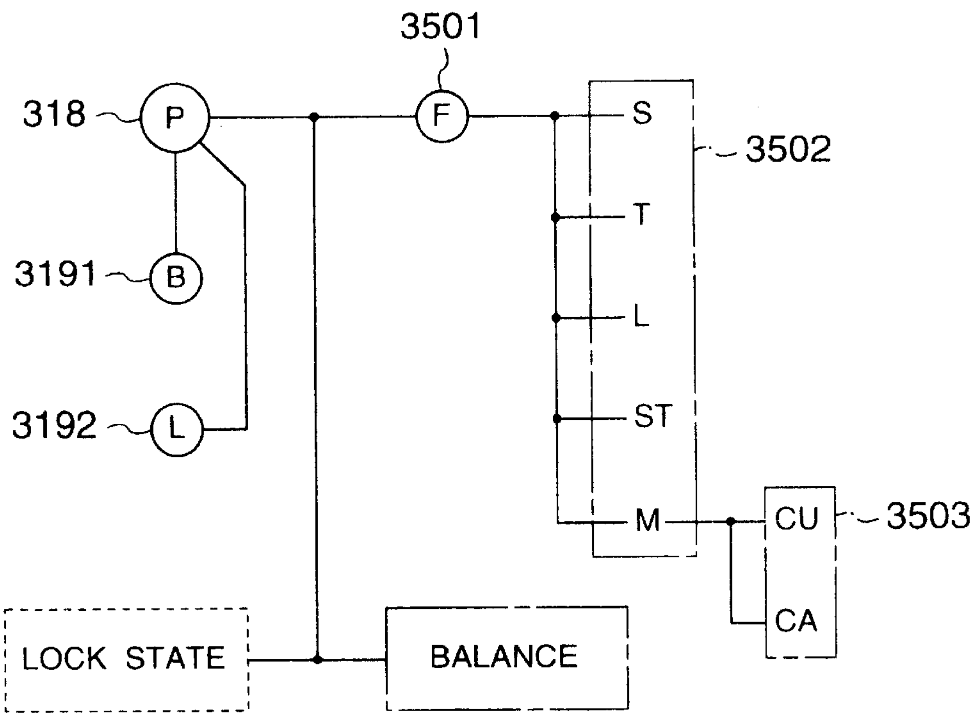
FIG. 9A is a diagram for explaining independent function switches, function keys and first and second function level layers.
Figure 9B:
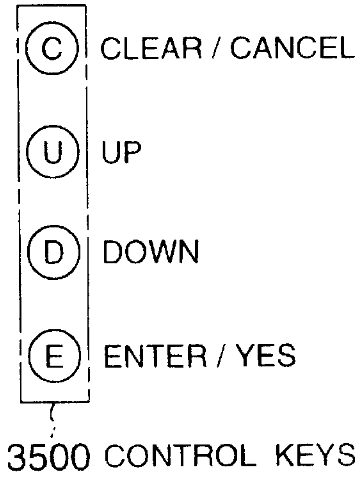
FIG. 9B is a diagram for explaining the control keys.
Figure 10:
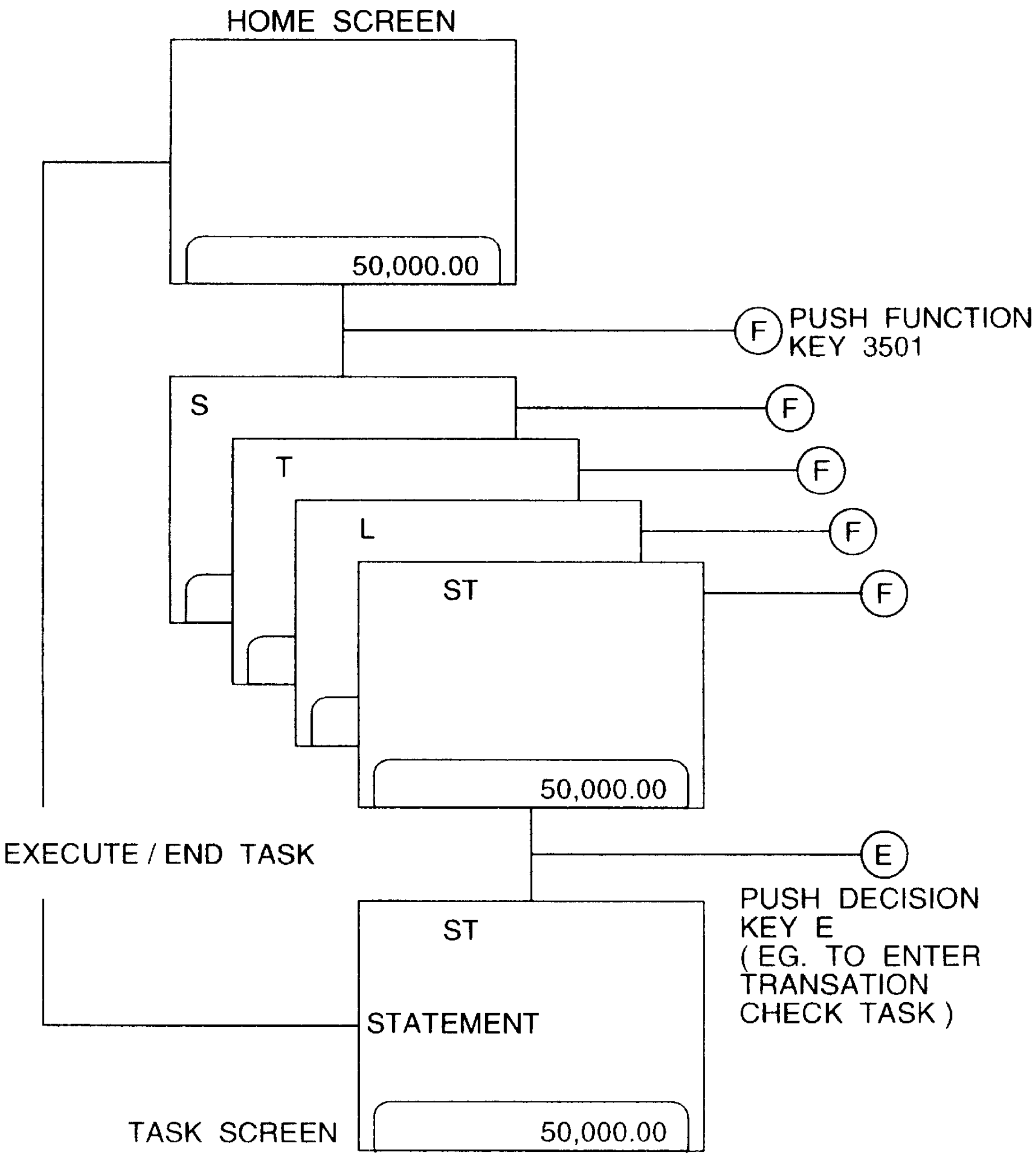
FIG. 10 is a diagram for explaining how to operate the electronic wallet and contents of the display unit.

FIG. 9A is a diagram for explaining function level layers of the electronic wallet 31 of the embodiment of the present invention, FIG. 9B shows the control keys 3500, and FIG. 10 is a diagram for explaining the functional operations of the electronic wallet 31 of the present invention. The function level layers and functional operations will be explained below with reference to FIGS. 9A, 9B and 10.

In FIG. 9A, the first and second independent function switches 3191 and 3192, which are represented by B and L, are used to indicate the balance of the electronic money of the IC card and to prompt the user to enter his password to unlock the card, respectively. These switches, which comprise each a nonlock switch, act to turn ON the power only during user's depression of the switches to execute their allocated functions.

Figure 14A:
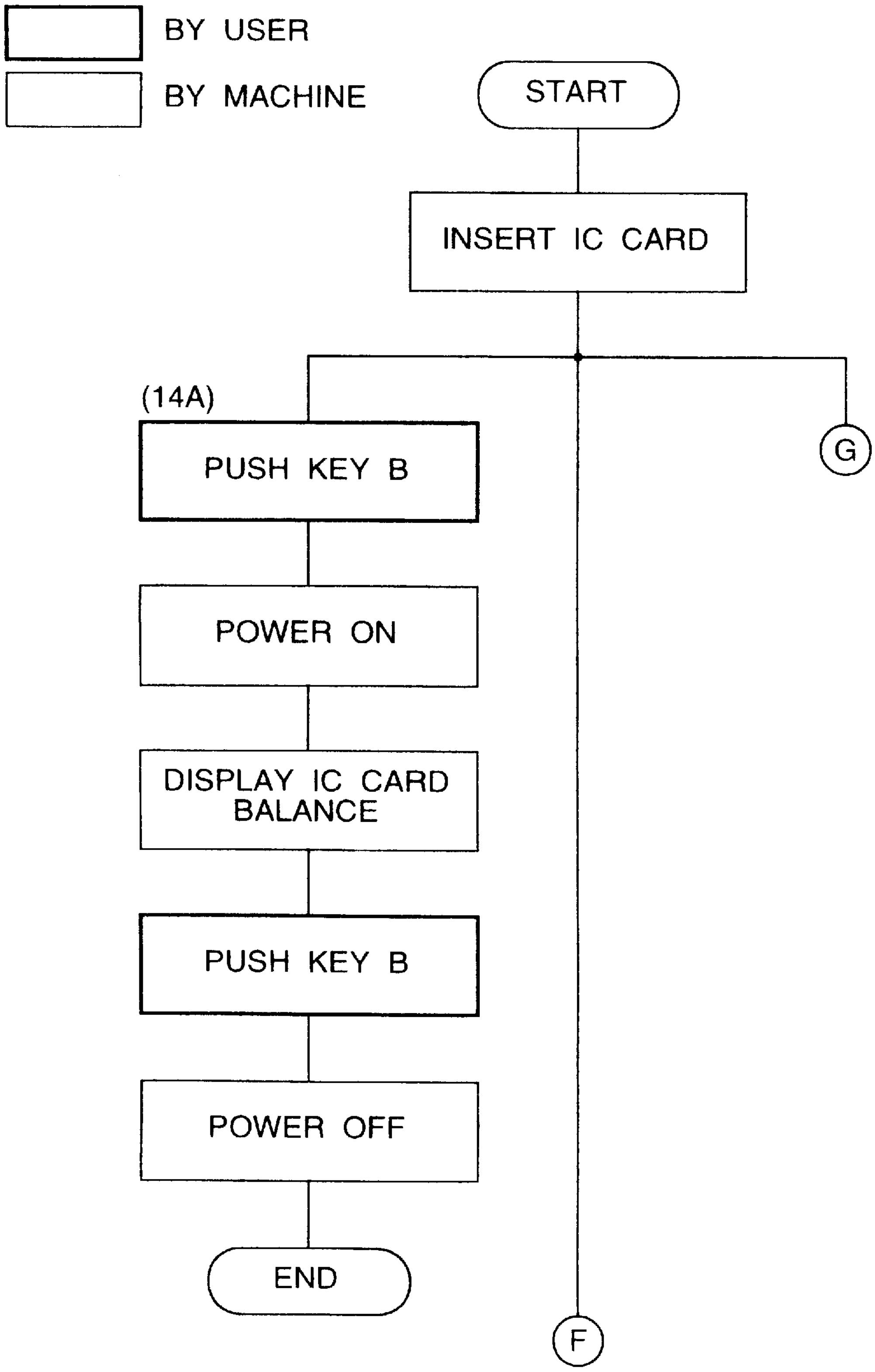
FIGS. 14A, 14B, and 14C are a flowchart for explaining a procedure when the IC card state is displayed on the display unit.

More specifically, when the user pushes the first independent function switch 3191 (B) while his IC card 10 is housed in the electronic wallet 31, an internal circuit of the IC card reader/writer 315 reads out the balance of the electronic money from the IC card 10 to cause the controller 314 to display the balance on the liquid crystal display part 312, only during the depression of the switch B. This operation is shown by a routine 14A in a flowchart of FIG. 14A.

Figure 14B:
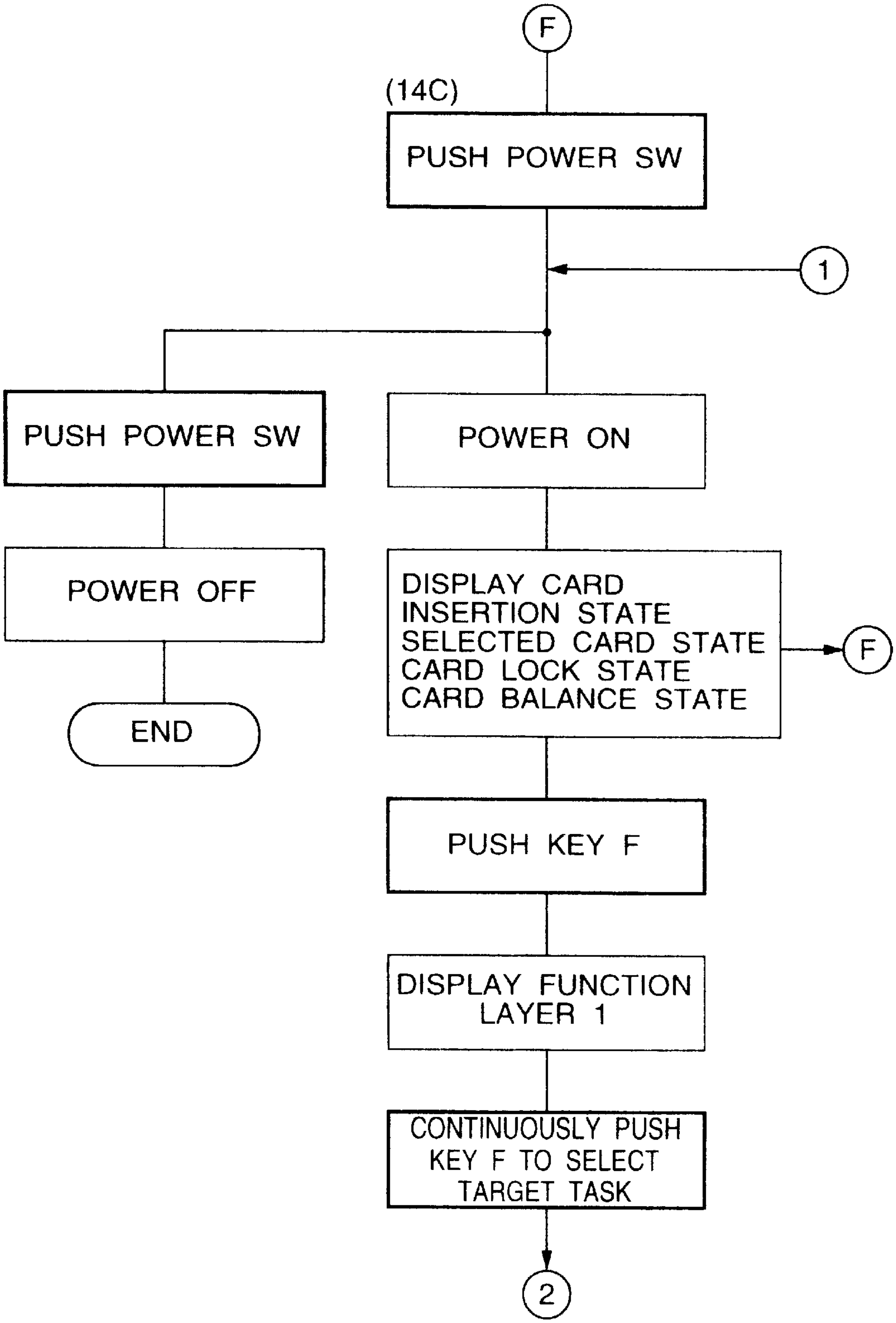
Figure 14C:
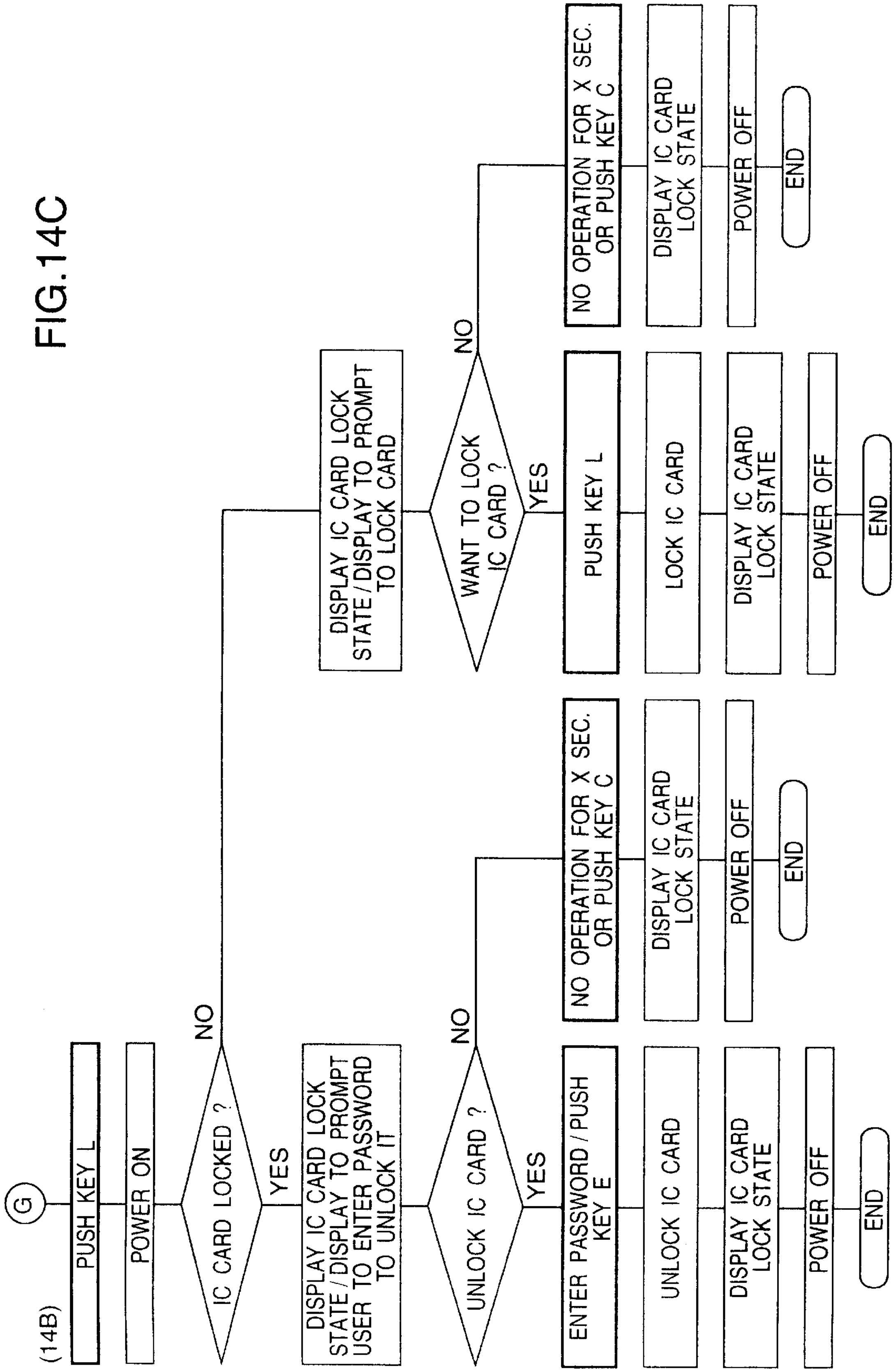

When the user pushes the first independent function switch 3192 (L), this causes the controller 314 to controllably put the IC card in its unlock or lock mode to unlock the IC card 10 of the electronic wallet 31 to allow transfer of the electronic money thereto or therefrom or to lock the IC card, respectively. When the user enters his password using numeric keys with the switch L being depressed, the IC card 10 can be unlocked. This operation is shown by a routine 14B in the flowchart of FIG. 14C.

Figure 13:
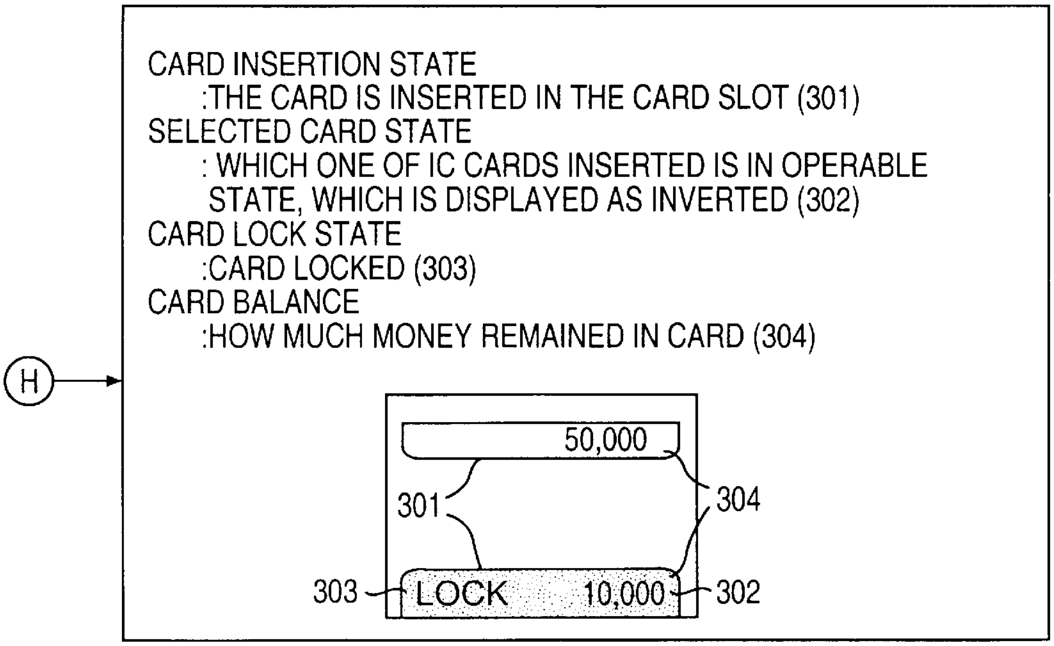
FIG. 13 is a diagram for explaining an IC card state appearing on the display unit of the electronic wallet.

When the user pushes the power switch 318 (P), this causes a home screen indicative of the balance of his IC card 10 to appear on the liquid crystal display part 312, as shown in FIG. 10. The card state information also appears on the display screen. The information, as shown in FIG. 13, include card insertion states 301 indicative of whether or not the cards are inserted into their card slots, a selected card state 302 indicative of which one of the inserted IC cards is put in its operable state, a card lock state 303 indicative of whether or not the IC card is locked, card balances 304 indicative of the balances of the IC cards. Thereafter, user's depression of the function key F causes an icon indicative of one of the aforementioned tasks S, T, L, ST and M in a first function level layer 3502 lower by one than the function key F to appear on the liquid crystal display part 312. This task display in the form of an icon is, as shown in FIG. 10, cyclically changed in its contents each time the function key F is depressed, at which time the icon flashes to indicate the selected task. When his desired task icon appears on the liquid crystal display part, user's depression of the enter key E as the run key in the control keys 3500 enables the task to be used or executed. At this time, the displayed icon stays lit continuously to indicate that the task is being executed. This operation is shown by a routine 14C in the flowchart of FIG. 14B.

Figure 15A:
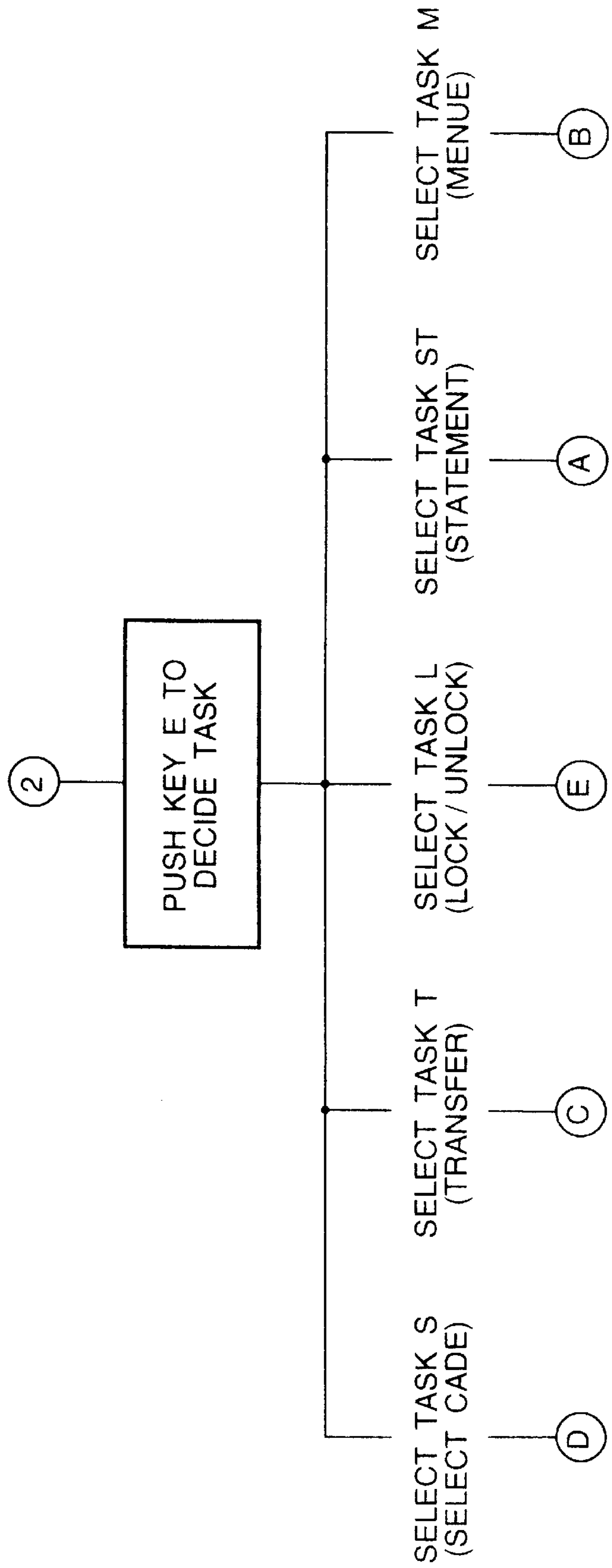
FIGS. 15A, 15B, 15C and 15D are a flowchart for explaining the procedure of the IC card processing functions.
Figure 15B:
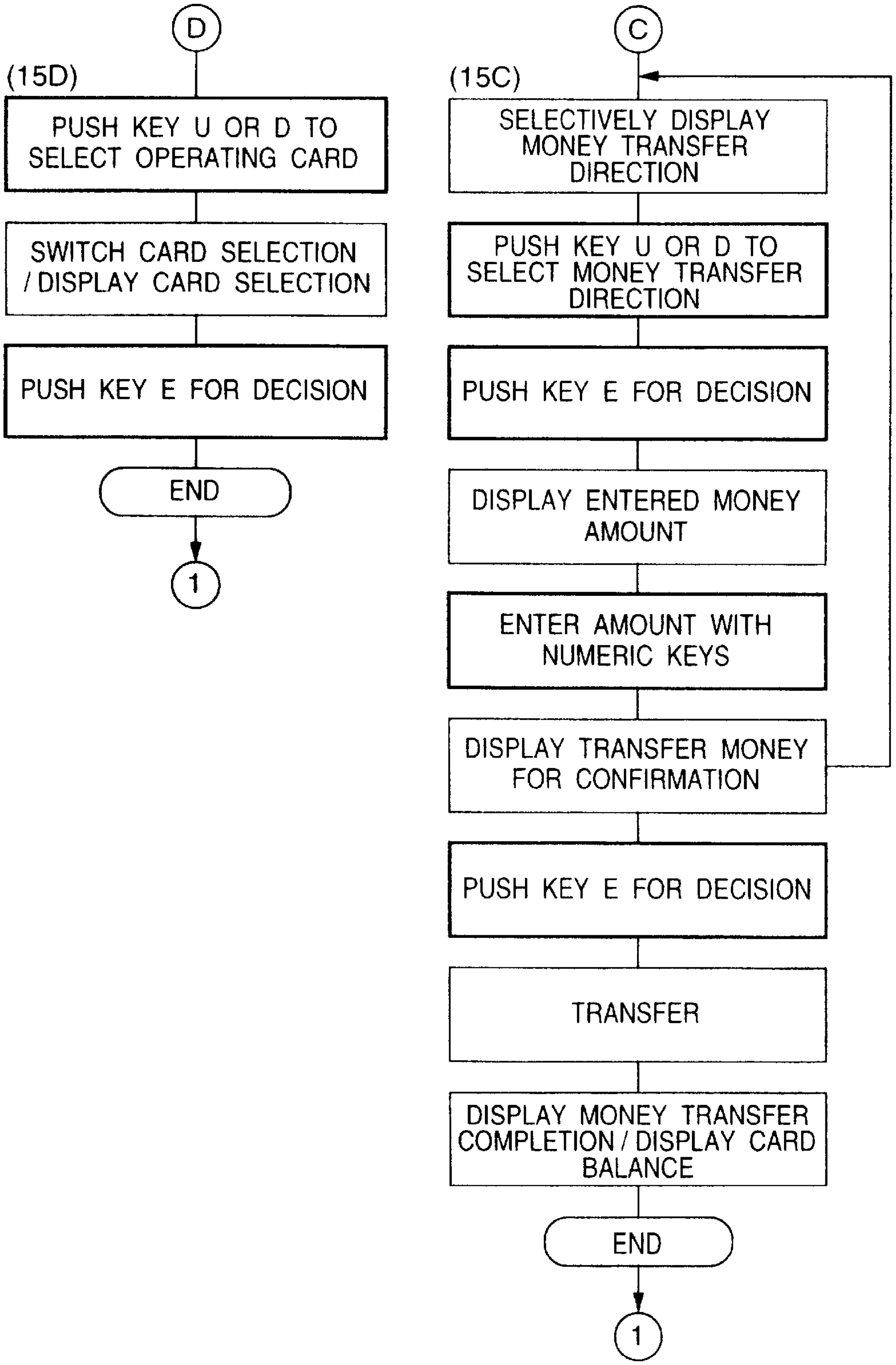
Figure 15C:
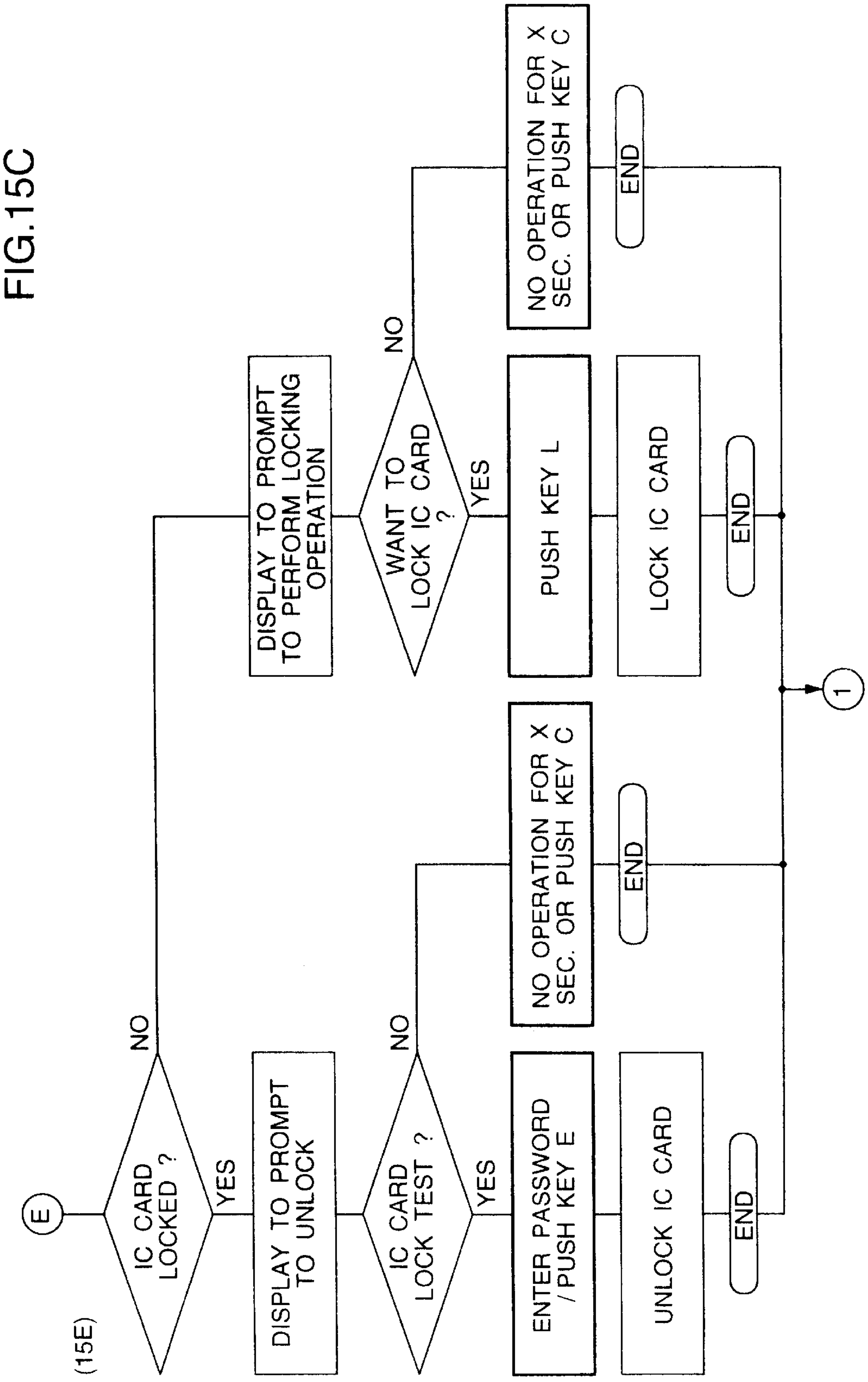
Figure 15D:
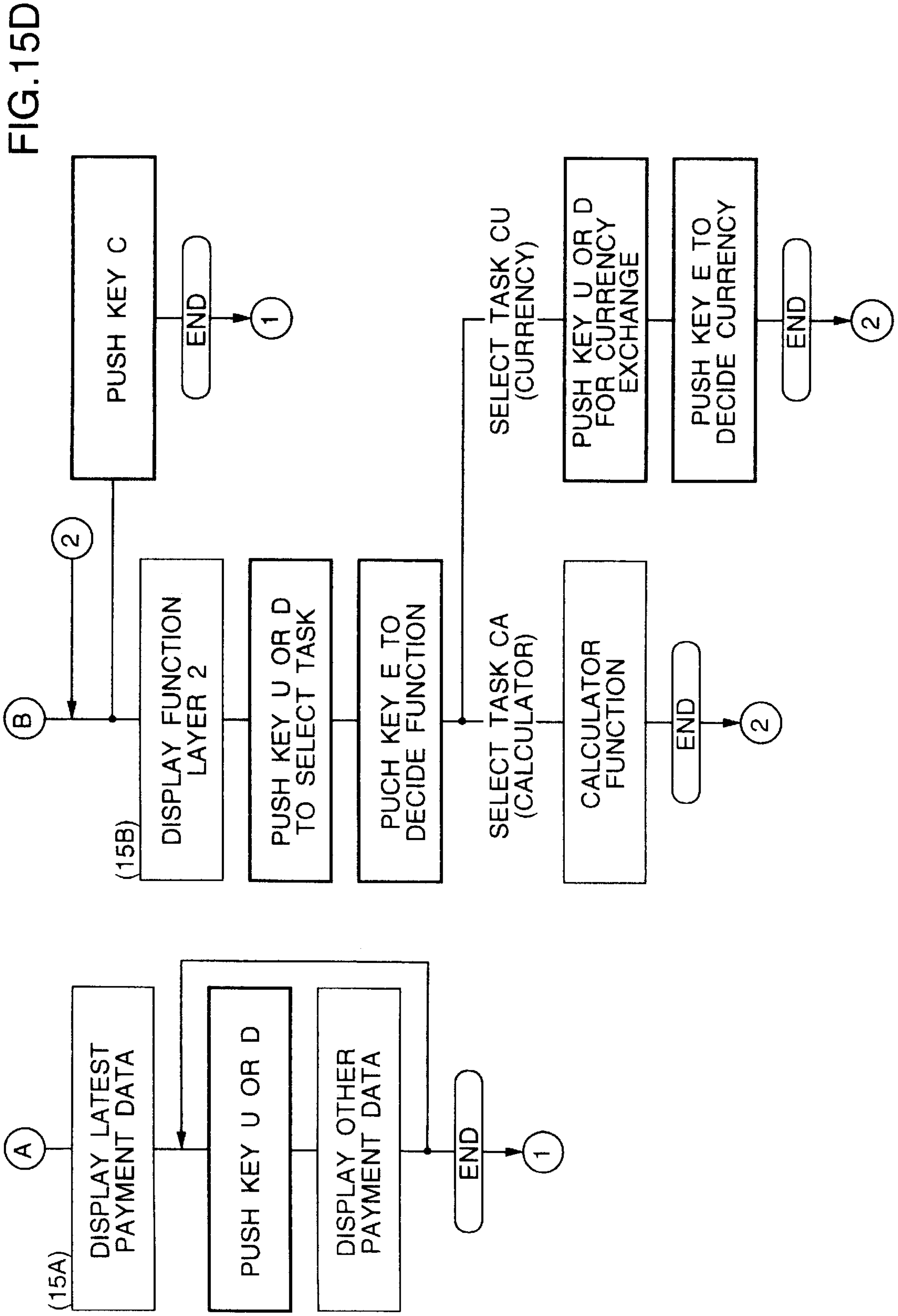

In the example of FIG. 10, since the task ST is selected and executed, transaction data based on the IC card 10 such as purchase data is displayed on the liquid crystal display part 312 in the form of a statement. When the user pushes the clear/cancel key C of the control keys 3500, this task terminates and the home screen again appears on the liquid crystal display part 312. The transaction information can be displayed by selecting the latest one of the tasks with use of the up key U and down key D. This operation is shown by a routine 15A in a flowchart of FIG. 15D.

The task M selected by the aforementioned function key F, as shown in FIG. 9A, is used to select one of tasks in a second function level layer 3503 one lower than the first function level layer 3502. In the example of FIG. 9A, when the user selects the task M in the first function level layer 3502 and pushes the enter key E, he can select the task CU or CA in the second function level layer 3503. The task CU having a currency exchange function, when the IC card 10 stores therein different country currencies, is used to select one of the currencies. The task CA, which has an electronic calculator function, enables the electronic wallet 31 to be used as an electronic calculator. The up and down keys U and D are used to show a currency exchange procedure displayed on the display part 312. This operation is shown by a routine 15B in the flowchart of FIG. 15D.

Figure 11:
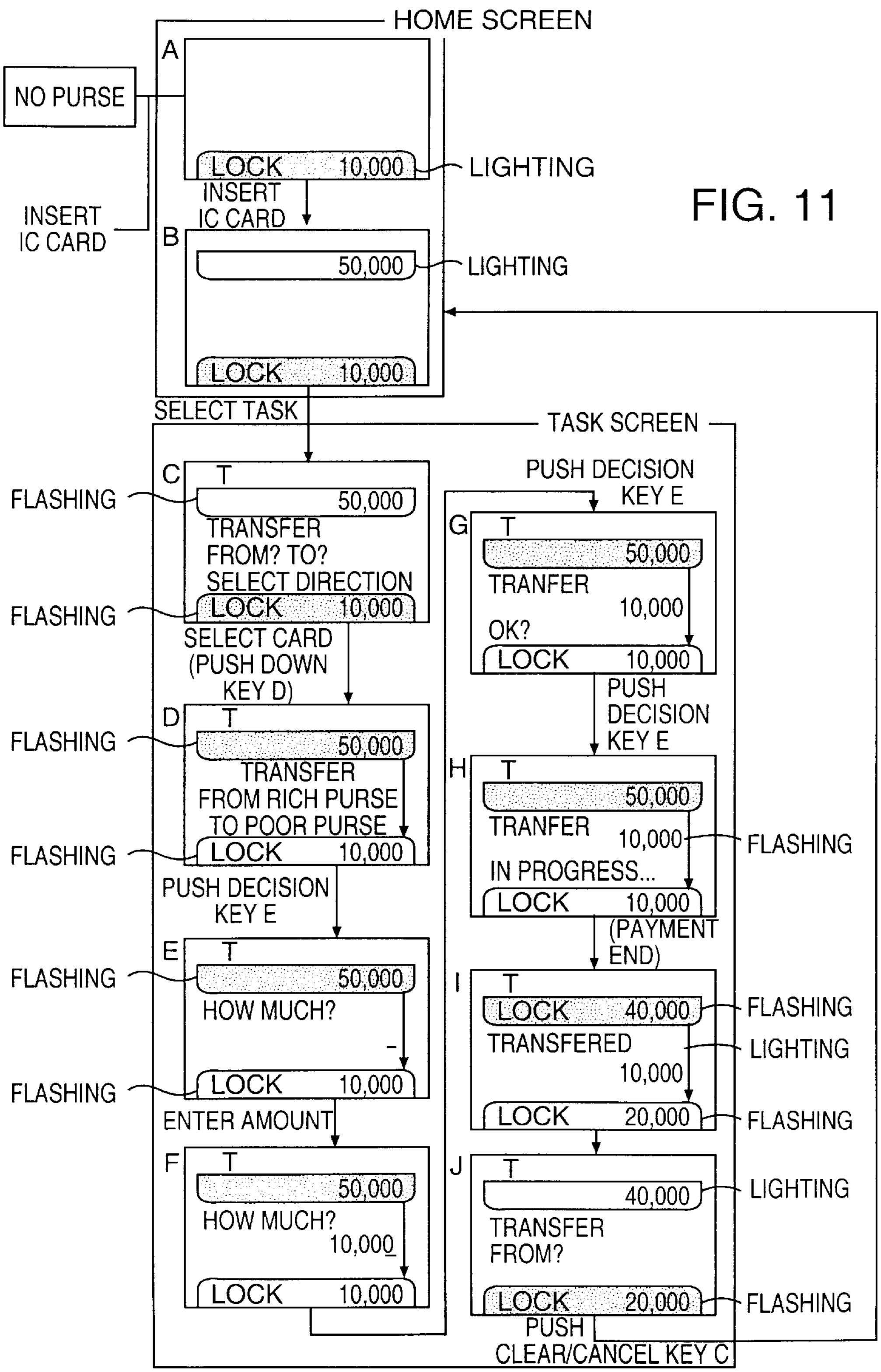
FIG. 11 is a diagram for explaining how to transfer electronic money between two IC cards of electronic wallets.

Turning to FIG. 11, there is shown a diagram for explaining an exemplary operation when electronic money transfer is carried out between the 2 IC cards 10 and 10' with use of the electronic wallet 31 of the embodiment of the present invention as arranged as mentioned above. The operation will be explained below.

(1) When the user inserts his IC card 10 into the electronic wallet 31 from the bottom side of the electronic wallet 31 or when he turns ON the power switch 318 with the IC card 10 being housed therein, this causes the balance of the electronic money of the IC card 10 and the lock state to appear as the home screen on the display part 312 of the electronic wallet 31 at the IC card 10 display position in the lower side of the display part. In the illustrated example, each of blackened zones indicates that the user can operate the associated card. The illustrated example, further, indicates that the IC card is put in the lock state (see a screen A in the drawing)

(2) When the user inserts the other IC card 10' with which he wants to conduct electronic money transfer between the IC cards 10 and 10' from the top side of the electronic wallet 31, this causes the balance of the electronic money of the IC card 10' to appear on the display part at the IC card 10' display position in the upper side thereof. The illustrated example indicates that the IC card 10' is put in the unlock state (see a screen B in the drawing).

(3) Next, when the user operates the function key F, selects the task T for transfer and then pushes the enter key E; this causes the upper IC card information 3122 and lower IC card information 3124 (see FIG. 8) to flash (see a screen C in the drawing).

(4) In order for the user to instruct the transfer direction of the electronic money under such a condition, the user pushes the up or down key U or D. In the illustrated example, the user pushes the down key D to transfer the electronic money from the upper-side IC card 10' to the lower-side IC card 10. As a result, a downward arrow is displayed to indicate the electronic money transfer from the upper-side IC card 10' to the lower-side IC card 10. In this connection, the lock of the IC card is required to be released only at the time of withdrawing the electronic money of the card, and thus in the illustrated example, the lower-side IC card 10 is allowed to be put in the lock state. Further, when it is desired to transfer the electronic money from the lower-side IC card 10 to the upper-side IC card 10', it is necessary to previously unlock the lower-side IC card 10 in the aforementioned screens C and D (see screen D).

(5) A depression of the enter key E as a decision key enables execution of the electronic money transfer, which results in that the so-far flashing display of the upper IC card information 3122 and lower IC card information 3124 is changed to the continuous lighting thereof and that the screen is changed to an instruction screen to prompt the user to enter the amount of electronic money to be transferred (see screen E).

(6) When the user enters the money amount to be transferred using numeric keys, the entered money amount appears on the screen. Thereafter, a push of the enter key E causes appearance of such a display screen as to confirm the presence or absence of an error appears on the display part. (see screens F and G).

(7) After confirming that the entered money amount to be transferred is correct, the user again pushes the enter key E. This causes the displayed money amount to flash, indicating that the money transfer is now being transferred. After the money transfer is completed, the displayed money amount stays lit continuously and the current balances of the electronic moneys of the upper- and lower-side IC cards 10 and 10' are displayed flashingly (see screens H and I).

(8) Thereafter, upper-side one of the balances of IC cards 10 and 10' being displayed after the transfer of the electronic money is changed from its flashing display to the continuous lighting display. Subsequently, the screen is changed to a mode enabling the transfer operation of the electronic money. In the mode, when the user pushes the clear/cancel key C of the control keys 3500, this causes the screen to be returned to the home screen, enabling selection and execution of the other function (see screens J and B). This operation is shown by a routine 15C in the flowchart of FIG. 15B.

Explanation has been made in connection with the exemplary operation of the electronic wallet in accordance with the embodiment of the present invention when the electronic wallet is used to transfer the electronic money between the 2 IC cards 10 and 10' in the foregoing. However, the present invention may also be applied to such a case that the electronic wallet is connected with a remove IC card via the communication line to perform electronic money transfer therebetween.

In FIGS. 14A–14C and FIGS. 15A–15D, blocks shown by thick lines indicate steps where the user should operate the electronic wallet 31, while the other blocks indicate steps where the electronic wallet 31 per se performs its functions.

Figure 12:
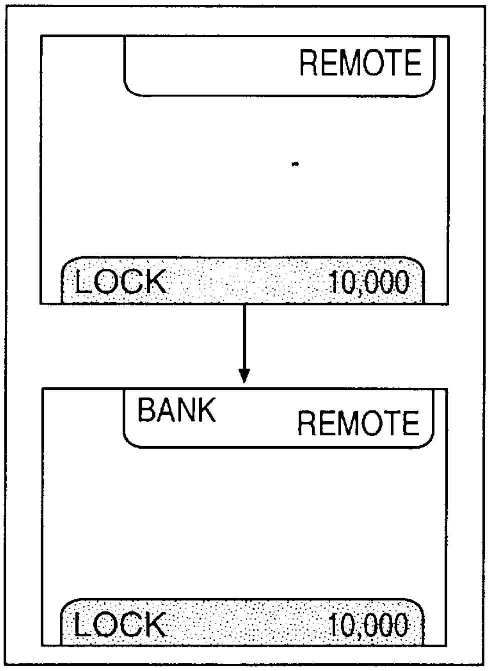
FIG. 12 is a diagram for explaining how to transfer electronic money between the IC card of an electronic wallet and the IC card of a remote electronic wallet.

FIG. 12 shows an example of display screens when the electronic wallet is connected to a remote IC card to perform electronic money transfer therewith, which will be explained below.

The example of FIG. 12 shows the screens when the electronic wallet is connected to a remote IC card in place of the upper-side IC card 10' through the communication line in the screen B in the example of the aforementioned electronic money transfer operation. Even in this case, in the same manner as the above, electronic money transfer can be realized between the 2 IC cards through the communication line. Further, when the remote IC card is the one located at a bank, this is indicated by "BANK" appearing on the display screen. In this case, in order to show one of the IC cards 10 and 10' inserted in the electronic wallet 31, the user instructs the task S of the first function level layer 3502 by pushing the function key 3501 (F) and the up or down key U or D to indicate the inserted IC card. This operation is shown by a routine 15D in the flowchart of FIG. 15. Further, a routine 15E shown in the flowchart of FIG. 15 is used when the user selects the task L in the first function level layer 3502 to lock or unlock the wallet.

The aforementioned electronic wallet of the embodiment of the present invention has been arranged so that the user can carry the wallet with his only one IC card mounted therein. In the existing electronic money system, however, the amount of electronic money to be recorded in the IC card is limited to be a predetermined value or less to prevent payment of electronic money exceeding the predetermined value. For the purpose of solving such a problem, the electronic wallet is considered to be arranged so that the wallet can accommodate a plurality of IC cards and the amount of payment can be distributed to the respective IC cards, whereby the electronic money of each IC card will not exceed the predetermined value.

Figure 16A:
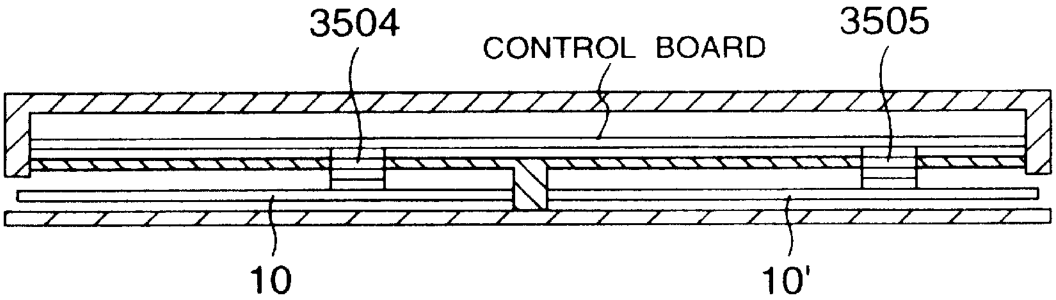
FIGS. 16A, 16B and 16C are cross-sectional views of the structures of the electronic wallet.
Figure 16B:
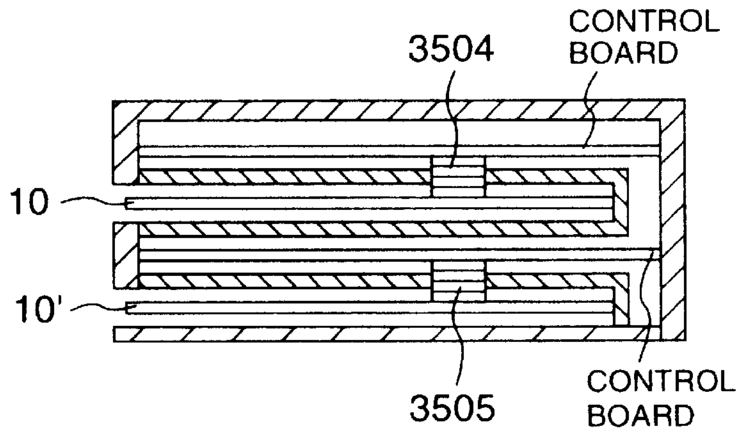
Figure 16C:
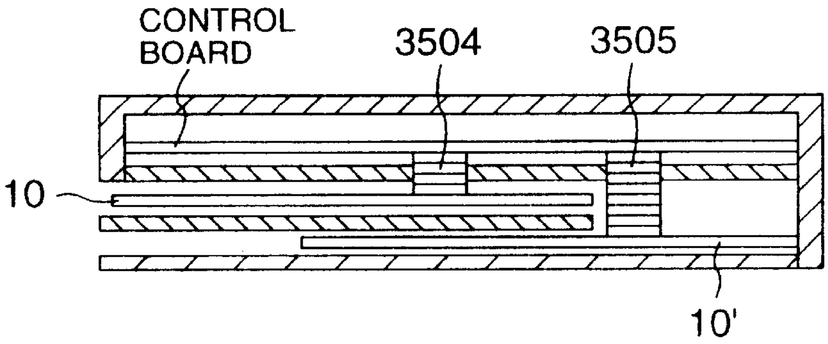

FIGS. 16A, 16B and 16C are diagrams for explaining the structures of such an electronic wallet 31 which can accommodate 2 of user 's IC cards.

FIG. 16A shows an example when the 2 IC cards are vertically arranged on an identical plane in a side-by-side positional relationship to avoid any increase in the thickness of the entire electronic wallet. In this example, the thickness of the wallet can be maintained without causing any increase but the length of the electronic wallet in its width direction is made longer. For the purpose of shortening the width-directional length of the wallet, the IC cards may be arranged in the thickness direction of the electronic wallet on an identical plane.

FIG. 16B shows an example where, in order to avoid any increase in the entire length of the electronic wallet, the 2 IC cards are accommodated in a mutually-overlapped positional relation. In this example, the thickness of the electronic wallet can be made somewhat larger but the width direction will not be made longer.

FIG. 16C is an example where contacts of the IC card reader/writers for two IC cards are positioned as shifted by a distance a within the electronic wallet so that the IC cards are partly overlapped with each other. In this example, the 2 IC cards can be accommodated within the electronic wallet so that the thickness of the electronic wallet is not so largely as that of FIG. 16B and the overall length thereof also is not so big as that of FIG. 16A.

In the examples of FIGS. 16A, 16B and 16C, the 2 IC cards of user own are accommodated within the electronic wallet but no consideration is paid to provision of the card reader/writer for the other IC card. However, the provision of the card reader/writer for the other IC card in the electronic wallet to realize electronic money transfer with the other IC card can be easily implemented merely by slightly increasing the size or thickness of the electronic wallet.

Although explanation has been made in the connection with the case where the electronic wallet 31 of the embodiment of the present invention is arranged to receive the IC card or cards from its bottom or top side, the wallet may be arranged to receive the card or cards from its right or left side. In addition, the electronic wallet 31 may also employ such a structure as disclosed in U.S. patent application Ser. No. 08/690,966 by Manabu Wakabayashi et al, entitled "Pocket-Size Information Transfer Apparatus and IC Card Using the Same".

What is claimed is:

1. An electronic wallet having a plurality of card slots accepting an IC card storing withdrawable electronic money information, comprising:

a plurality of operating keys;

a display part for displaying the electronic money information; and at least one independent function switch provided in addition to a power switch;

wherein the electronic money information stored in an IC card received in one of said card slots is displayed on the display part during a time of operating at least the independent function switch when the power switch is an off state.

2. An electronic wallet as set forth in claim 1, wherein the electronic money information displayed on said display part includes at least one of balances of the electronic money and a lock state for inhibiting data processing of one of the IC cards.

3. An electronic wallet having a plurality of card slots accepting an IC card storing withdrawable electronic money information comprising:

a plurality of operating keys;

a display part for displaying the electronic money information; and at least one independent function switch provided in addition to a power switch, wherein an IC card received in one of said card slots is permitted to be locked for indicating exclusive data processing during a time of operating at least the independent function switch when the power switch is an off state.

4. An electronic wallet as set forth in claim 3, wherein the electronic money information displayed on said display part includes at least one of balances of the electronic moneys and a lock state for one of the IC cards.

5. An electronic wallet as set forth in claim 4, wherein a lock key is operated to put one of said IC cards in the lock state, while a password is entered to release said lock state.

6. An electronic wallet as set forth in claim 4, wherein a lock key is operated to put one of said IC cards in the lock state, while secret character information is entered to release said lock state.

7. An electronic wallet having a plurality of card slots accepting an IC card storing withdrawable electronic money information, comprising:

a plurality of operating keys;

a display part for displaying the electronic money information;

a power switch; and a controller having a contact and providing a predetermined time when an IC card received in one of said card slots is contacted with the contact, for displaying the electronic money information stored in said IC card on the display part during the predetermined time while the power switch is an off state.

8. An electronic wallet as set forth in claim 7, wherein the electronic money information displayed on said display part includes at least one of balances of the electronic moneys and a lock state for inhibiting data processing of one of the IC cards.

9. An electronic wallet having a plurality of card slots accepting an IC card storing withdrawable electronic money information, comprising:

a plurality of operating keys including plural numeric keys and calculation keys;

a display part for displaying the electronic money information and IC card state information;

at least one independent function switch in addition to a power switch;

a plurality of control keys for operating the electronic money information and the IC card state information stored in an IC card; and a function key including a plurality of function hierarchies having a plurality of tasks for selecting one of the plurality of tasks included in each of the function hierarchies, wherein the electronic money information stored in an IC card received in one of said card slots is displayed on the display part during a time of operating at least the independent function switch when the power switch is an off state.

10. An electronic wallet as set forth in claim 9, wherein the electronic money information displayed on said display part include balances of the electronic moneys; and said IC card state information include a card lock state indicative of inhibition of data processing of one of said IC cards, a selected card state indicative of which one of the IC cards inserted in said plurality of card slots, and a card insertion state indicative of one of the IC cards being inserted in one of said card slots.

11. An electronic wallet as set forth in claim 10, further comprising It card readers/writers provided for each of the two IC cards inserted in said card slots, a microprocessor for causing said IC card readers/writers to perform reading/writing operation over the electronic money under control of said controller, and a modem connector for connection with a modem unit.

12. An electronic wallet as set forth in claim 11, wherein said modem unit is removably mounted to said card slots of said electronic wallet, said modem unit is provided with a through opening to communicate with said card slots and a modular jack to be connected to a communication line, so that, when said modem unit is already mounted to said card slots, said IC card can be inserted from said card slots.

13. An electronic wallet as set forth in claim 12, wherein a party to which said electronic money information is to be transferred from one of said IC cards is (1) the other of said IC cards inserted into the other card slot, (2) a terminal capable of transmitting or receiving electronic money to or from said IC card, or (3) an IC card of another electronic wallet connected to said electronic wallet through said modem unit.

14. An electronic wallet having a plurality of card slots accepting an IC card storing withdrawable electronic money information, comprising:

a plurality of operating keys including plural numeric keys and calculation keys;

a display part for displaying the electronic money information and IC card state information;

at least one independent function switch in addition to a lower switch;

a plurality of control keys for operating the electronic money information and the IC card state information stored in an IC card received in one of said card slots; and a function key including a plurality of function hierarchies having a plurality of tasks, for selecting one of the plurality of tasks included in each of the function hierarchies, wherein the function hierarchies selected by the function key is a first function hierarchy having:

(1) a first subtask for selecting one of a first and second IC cards inserted into the card slot at least;

(2) a second subtask for making the first and second IC cards locked;

(3) a third subtask for transferring the electronic money information;

(4) a fourth subtask for displaying history information of the first and second IC cards on the display part; and (5) a fifth subtask for selecting a second function hierarchy.

15. An electronic wallet according to claim 14, wherein the second function hierarchy selected by the fifth subtask includes:

(1a) a first sub-subtask for selecting a predetermined currency from a plurality of electronic currencies stored in the IC card; and (2a) a second sub-subtask for providing a calculation function with operation of the numeric keys and the calculation keys.

16. An electronic wallet as set forth in claim 12, wherein said control keys include a clear/cancel key for clearing the information displayed on said display part and for stopping transfer of said electronic money in process, up and down keys for instructing a transfer direction of said electronic money, and a decision key for instruction execution; said up and down keys have functions of (1) when said first subtask is instructed, instructing either one of said first and second IC cards by operation of any of said keys; (2) instructing the transfer direction of said electronic money information by operation of any of said keys; (3) when said fourth subtask is instructed, searching for the latest transaction information of said IC card from the beginning by operation of any of said keys; and (4) when said fifth subtask is instructed, selecting tasks of said second function level layer by operation of any of said keys.

17. A method for operating an electronic wallet having a plurality of card slots accepting an IC card storing withdrawable electronic money information, comprising the steps of:

(a) inserting an IC card into a card slot;

(b) operating at least one independent function switch provided in addition to a power switch with the power switch off; and (c) displaying the electronic money information on a display during a time of operating the independent function key.

18. A method according to claim 17 wherein, in the step (c), one electronic money balance and a locked state indicative of exclusive data processing in relation to an IC card are displayed on the display part as electronic money information.

19. A method of operating an electronic wallet having a plurality of card slots accepting an IC card storing withdrawable electronic money information, comprising the steps of:

(a) inserting an IC card into a card slot;

(b) operating at least one independent function switch provided in addition to a power switch with the power switch off; and (c) making the IC card lock to indicate exclusive data processing during a time of operating the independent function switch.

20. A method for operating an electronic wallet as set forth in claim 19, wherein, in said step (c), a user pushes a lock key to put the IC card in said lock state, and enters a password to release said lock state.

21. A method for operating an electronic wallet as set forth in claim 19, wherein, in said step (c), a user pushes a lock key to put the IC card in said lock state, and enters secret character information to release said lock state.

22. A method of operating an electronic wallet having a plurality of card slots accepting an IC card storing withdrawable electronic money information, comprising the steps of:

(a) inserting an IC card into a card slot;

(b) contacting a contact of the IC card to a contact of a controller with a power switch off; and (c) displaying an electronic currency information stored in an IC card during a predetermined time provided by the controller.

23. A method according to claim 22 wherein, in the step (c), an electronic money balance and a locked state indicative of exclusive data processing in relation to an IC card are displayed on the display part as electronic money information.

24. A method of operating an electronic wallet which has a plurality of card slots for removably receiving IC cards and which allows electronic money information to be withdrawably stored in the IC cards, the method comprising the steps of:

(a) inserting IC cards into the card slots;

(b) operating at least one independent function switch provided in addition to a power switch with the power switch off and displaying the electronic money information stored in an IC card during the operation of the independent function switch;

(c) displaying the electronic money information stored in an IC card and IC card state information on a display part;

(d) displaying a plurality of tasks having predetermined function hierarchies on the display part with use of a function key;

(e) operating the IC card state information according to the IC card state information;

(f) instructing any of the plurality of tasks with use of the function key; and (g) executing the selected tasks with use of respective control keys.

25. A method for operating an electronic wallet as set forth in claim 24, wherein, in said step (b), the electronic money balances are displayed on said display part as said electronic money information; and a card lock state indicative of inhibition of data processing of one of said IC cards, a selected card state indicative of which one of the IC cards inserted in said plurality of card slots, and a card insertion state indicative of one of the IC cards being inserted in one of said card slots are also displayed on the display part as said IC card state information.

26. A method of operating an electronic wallet which has a plurality of card slots for removably receiving IC cards and which allows electronic money information to be withdrawably stored in the IC cards, the method comprising the steps of:

(a) inserting IC cards into the card slots;

(b) displaying the electronic money information stored in IC cards and IC card state information on a display part;

(c) displaying a plurality of tasks having a predetermined function hierarchies on the display part with use of a function key, each of the tasks including a first subtask for selecting either one of first and second IC cards inserted into the card slots, a second subtask for locking the first and second IC cards, a third subtask for transferring the electronic money information, a fourth subtask for displaying transaction information of the first and second IC cards on the display part, and a fifth subtask for selecting a second function hierarchy, which are displayed on the display part as a task of a first function hierarchy;

(d) operating the IC card state information according to the IC card state information;

(e) instructing any of the plurality of tasks with use of the function key; and (f) executing the selected tasks with use of respective control keys.

27. A method according to claim 26 wherein, in the step (c), the second function hierarchy selected by the fifth subtask and displayed on the display part includes:

a first sub-subtask for selecting a predetermined currency from a plurality of electronic currencies stored in the IC card; and a second sub-subtask for providing a calculation function with operation of numeric keys and calculation keys.

28. A method for operating an electronic wallet as set forth in claim 27, wherein said control keys include a clear/cancel key for clearing the information displayed on said display part and for stopping transfer of said electronic money in process, up and down keys for instructing a transfer direction of said electronic money, and a decision key for instruction execution; said up and down keys have functions of (1) when said first subtask is instructed, instructing either one of said first and second IC cards by operation of any of said keys; (2) when the third subtask is instructed, instructing the transfer direction of said electronic money information by operation of any of said keys; (3) when said fourth subtask is instructed, searching for the latest transaction information of said IC card from the beginning by operation of any of said keys; and (4) when said fifth subtask is instructed, selecting tasks of said second function level layer by operation of any of said keys.

29. A method for operating an electronic wallet as set forth in claim 26, wherein, in said step (d), change of said IC card state information is carried out so that, when a user instructs said first function level layer with use of said function key and enters user's password with use of said operating keys, said card lock state is released, whereas, when the user operates said second subtask, the card is returned to said card lock state.

* * * * *